(12) United States Patent
Yoon et al.

(10) Patent No.: US 6,822,508 B2
(45) Date of Patent: Nov. 23, 2004

(54) COMMUNICATION DEVICE, COMMUNICATION METHOD, PROGRAM, AND STORAGE MEDIUM

(75) Inventors: Young C. Yoon, Ontario (CA); Ryuji Kohno, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 10/090,938

(22) Filed: Mar. 5, 2002

(65) Prior Publication Data

US 2002/0190786 A1 Dec. 19, 2002

(30) Foreign Application Priority Data

Mar. 8, 2001 (JP) ........................................ P2001-065073

(51) Int. Cl.[7] ................................................ H03D 3/00

(52) U.S. Cl. ........................ 329/319; 329/320; 329/321

(58) Field of Search ................................ 375/346, 324, 375/340, 239; 329/315, 319, 320, 321, 349, 312, 311, 313; 348/614; 342/51

(56) References Cited

U.S. PATENT DOCUMENTS

| | | | | |
|---|---|---|---|---|
| 6,377,620 B1 | * | 4/2002 | Ozluturk et al. | 375/235 |
| 6,404,760 B1 | * | 6/2002 | Holtzman et al. | 370/342 |
| 6,437,832 B1 | * | 8/2002 | Grabb et al. | 348/614 |
| 6,497,656 B1 | * | 12/2002 | Evans et al. | 600/300 |
| 6,505,032 B1 | * | 1/2003 | McCorkle et al. | 455/41 |

* cited by examiner

*Primary Examiner*—Tuan T. Lam
*Assistant Examiner*—Hiep Nguyen
(74) *Attorney, Agent, or Firm*—Jay H. Maioli

(57) ABSTRACT

A high-performance demodulator for use in UWB (Ultra WideBand) multiple-access communication is disclosed. In a communication device, the correlation between a received signal corresponding to signals transmitted from a plurality of communication terminals by means of UWB (Ultra WideBand) communication and pulses at possible positions in a signal transmitted from each communication terminal is calculated. On the basis of the resultant calculated correlation, and taking into account interference among the signals transmitted from the communication terminals, the received signal is demodulated into original data issued by the respective communication terminals.

5 Claims, 15 Drawing Sheets

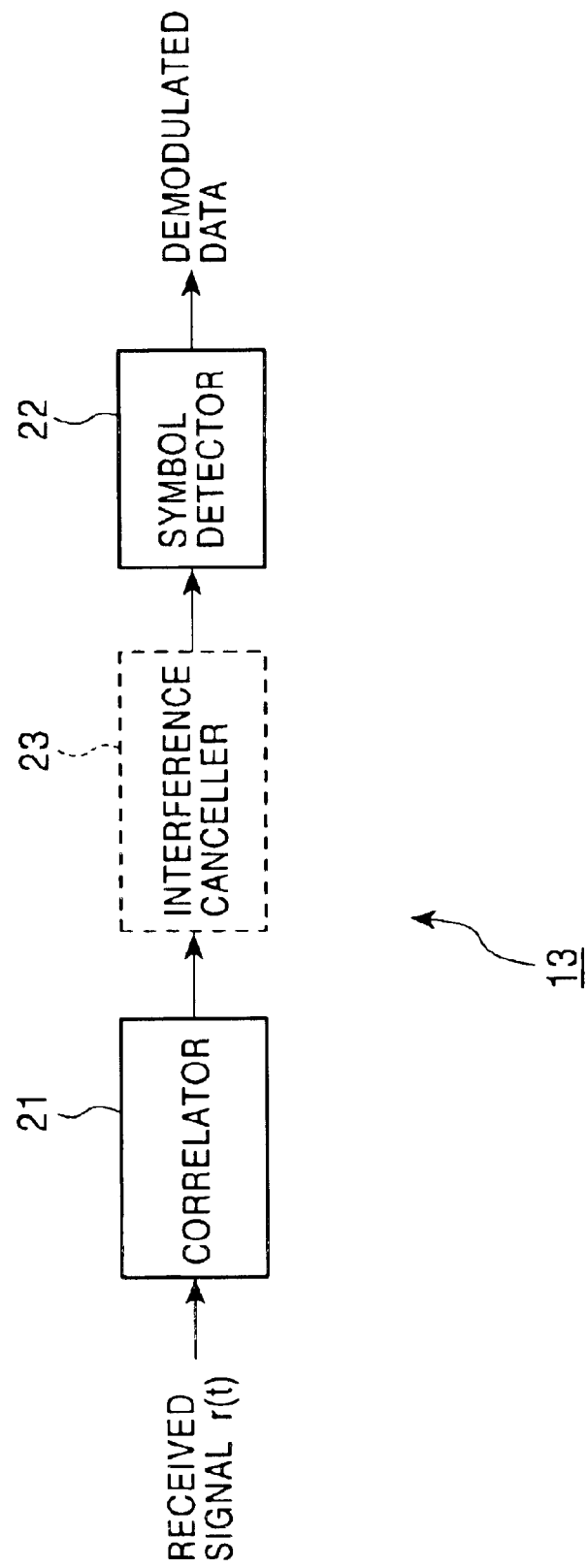

COMMUNICATION DEVICE, COMMUNICATION METHOD, PROGRAM, AND STORAGE MEDIUM

BACKGROUND OF THE INVENTION

1. Field of the Invention

The present invention relates to a communication device, a communication method, a program, and a storage medium. More particularly, the present invention relates to a communication device, a communication method, a program, and a storage medium storing a program, which allow multiple access in UWB (ultra wideband) communication.

2. Description of the Related Art

UWB communication is also called impulse radio communication and is expected to find various applications, as discussed for example, in "Impulse radio: How it works" by M. Z. Win and R. A. Scholtz (IEEE Communication Letters, Vol. 2, pp. 36–38, February, 1998 (hereinafter, this literature will be denoted as "Ref. 1")), "UWB waveforms ad coding for communications and radar" by L Fullerton (Proc. IEEE Telesystems Conf., pp. 139–141, Mar. 26–27, 1991 (hereinafter, this literature will be denoted as "Ref. 2")), and "Answers to questions posed by Bob Lucky, Chairman of the FCC's Technical Advisory Committee (e-mail correspondence, http://ultra.usc.edu./ulab, Jun. 29, 1999 (hereinafter, this literature will be denoted as "Ref. 3")).

In UWB communication, data is transmitted using a very short pulse at low power without using a carrier. To transmit such a very short pulse, a wide bandwidth on the order of several GHz is used, as described, for example, in Ref. 1 or 2.

The UWB communication technology has many advantages that stem from its ultra-wideband nature, as described in, for example, "On the robustness of ultra-wideband width signals in dense multipath environments" by M. Z. Win and R. A. Scholtz (IEEE Communication Letters, Vol. 2, pp. 51–53, February, 1998 (hereinafter, this literature will be denoted as "Ref. 4")), and "On the analysis of UWB communication channels" by J. M. Cramer, R. A. Scholtz, and M. Z. Win (Proc. IEEE Military Communications Conf., pp. 1191–1195, Oct. 31 to Nov. 3, 1999 (hereinafter, denoted as "Ref. 5")). More specifically, it can penetrate walls, experience significantly less fading, offer extremely fine time-resolution, and deliver large processing gains.

In particular, the absence of a carrier signal in the UWB communication obviates the need for radio frequency (RF) or intermediate frequency (IF) circuits. This allows reductions in device size and power consumption.

These characteristics of the UWB communication technology give it substantial advantages over conventional narrowband, wideband and infrared wireless communication systems.

Potential applications of the UWB communication include wireless local area networks (LAN), information distribution systems for use in a medical application or the like, outdoor or indoor wireless multiple-access communication systems, ranging devices, and other many applications, as described in, for example, "Catching the wave; Breakthroughs in wireless technology" by J. S. Gage (MD Computing: The Leading Edge in Medical and Healthcare Informatics, Vol. 16, March/April 1999 (hereinafter, denoted as "Ref. 6")), and "Ultra-wideband width time-hopping spread-spectrum impulse radio for wireless multiple-access communications" by M. Z. Win and R. A. Scholtz (IEEE Trans. Communications, Vol. 48, pp. 679–691, April, 2000 (hereinafter, denoted as "Ref. 7")).

There is a great need for applying the UWB communication technology to multiple-access (multi-user) communication with a plurality of communication terminals. The idea of applying UWB to multiple-access communication is discussed in, for example, "Multiple access with time-hopping impulse modulation" by R. A. Scholtz (Proc. IEEE Military Communications Conf. (Boston, U.S.), pp. 447–450, Oct. 11–14, 1993 (hereinafter, denoted as "Ref. 8")), and "Multiple-access performance limits with time hopping and pulse position modulation" by F. Ramirez-Mireles and R. A. Scholtz (Proc. IEEE Military Communications Conf., pp. 529–533, Oct. 18–21, 1998 (hereinafter, denoted as "Ref. 9")).

UWB multiple-access communication systems proposed in Refs. 7 to 9 are conceptually similar to asynchronous code-division multiple-access (CDMA) systems in certain aspects. Transmitted signals of each user (signals transmitted from each communication terminal) share a common spectrum, and the set of signaling waveforms across all users are not necessarily orthogonal.

The multiple-access capability of a UWB system is primarily determined by the processing gain that is given by the pulse bandwidth to the pulse (or symbol) repetition frequency (RPF) ratio. In the UWB communication, its very wide frequency bandwidth results in a high processing gain. The UWB communication technology is very different from the CDMA communication technology in that the high processing gain of the UWB communication allows it to be advantageously employed in applications in which power is limited.

In the literatures Ref. 1 and Refs. 7 to 9, it is proposed to realize multiple-access UWB communication by time-hopping the timing of transmitting pulse-position-modulated signals of respective users on the basis of a time-hopping sequence indicated by a pseudorandom number.

Herein, the "pulse position modulation" refers to modulation of pulse positions depending on data to be transmitted. For example, a unit period with a predetermined length is assigned to one symbol, and each period is divided into M intervals. A pulse is placed in one of the M intervals, at a position corresponding to data to be transmitted. The "time hopping" refers to an operation of, rather than transmitting symbols (unit periods) at fixed intervals, randomly shifting the transmission timing from the fixed intervals.

In the proposed UWB multiple-access communication techniques, each receiving device includes a single-user demodulator for detecting the pulse position, in each unit period, of a pulse-position-modulated signal.

The single-user demodulator includes a filter bank including filters for matching the received signal with pulses at possible positions in unit periods, and a detector for detecting a filter that provides a highest output among the filters of the filter bank, and employing, as demodulated data, a value corresponding to a pulse position that is matched with the received signal by the filter that is determined to provide the highest output.

Ideally, in the multiple-access communication, there is no overlap among pulses of signals transmitted from users. Under such an ideal condition, the single-user demodulator can function as an ideal demodulator for demodulating a pulse-position-modulated signal in an environment including additive white Gaussian noise. In this case, the single-user demodulator may be constructed in a similar fashion to a single-user matched filter for detection in CDMA systems, as described, for example, in "Multiuser detection for CDMA systems" by A. Duel-Hallen, J. Holtzman and Z. Zvonar (IEEE Personal Communications Magazine, Vol. 2, pp. 46–58, April, 1995 (hereinafter, denoted as "Ref. 10")), "Multi-user detection for DS-CDMA communications", by S. Moshavi (IEEE Communications Magazine, Vol. 34, pp. 124–136, October, 1996 (hereinafter, denoted as "Ref. 11")), and "Multiuser Detection" by S. Verdu (Cambridge University Press, 1998 (hereinafter, denoted as "Ref. 12")).

However, in practical multiple-access communication systems, interference occurs among signals transmitted from users (hereinafter, such interference will be referred to as multiple-access interference), and multiple-access interference (MAI) is generally not Gaussian. The conventional single-user modulator is no longer optimal in such an environment in which MAI can occur.

MAI increases with the number of multiple-access users, and the increase in MAI causes various adverse effects on the single-user demodulator. When data is transmitted at a high rate, the resultant high pulse repetition frequency causes a reduction in the processing gain and thus an increase in MAI.

In view of the above, it is an object of the present invention to provide a high-performance demodulator for use in UWB multiple-access communication.

SUMMARY OF THE INVENTION

According to an aspect of the present invention, there is provided a communication device comprising correlation calculation means for calculating the correlation between a received signal corresponding to signals transmitted from a plurality of communication terminals by means of UWB (ultra wideband) communication and pulses at possible positions in a signal transmitted from each communication terminal; and demodulation means for demodulating data transmitted from the respective communication terminals on the basis of the correlation, taking into account interference among the signals transmitted from the communication terminals.

According to another aspect of the present invention, there is provided a communication method comprising the steps of calculating the correlation between a received signal corresponding to signals transmitted from a plurality of communication terminals by means of UWB (ultra wideband) communication and pulses at possible positions in a signal transmitted from each communication terminal; and demodulating data transmitted from the respective communication terminals on the basis of the correlation, taking into account interference among the signals transmitted from the communication terminals.

According to still another aspect of the present invention, there is provided a program comprising the steps of calculating the correlation between a received signal corresponding to signals transmitted from a plurality of communication terminals by means of UWB (ultra wideband) communication and pulses at possible positions in a signal transmitted from each communication terminal; and demodulating data transmitted from the respective communication terminals on the basis of the correlation, taking into account interference among the signals transmitted from the communication terminals.

According to still another aspect of the present invention, there is provided a storage medium storing program comprising the steps of calculating the correlation between a received signal corresponding to signals transmitted from a plurality of communication terminals by means of UWB (ultra wideband) communication and pulses at possible positions in a signal transmitted from each communication terminal; and demodulating data transmitted from the respective communication terminals on the basis of the correlation, taking into account interference among the signals transmitted from the communication terminals.

That is, in the communication device, the communication method, and the program according to the present invention, the correlation is calculated between the received signal corresponding to the signals transmitted from a plurality of communication terminals by means of UWB (Ultra WideBand) communication technology and pulses at possible positions in the transmitted signals from the respective communication terminals, and the received signal is demodulated into original data issued by the communication terminals on the basis of the calculated correlation taking into account interference among the transmitted signals from the respective communication terminals.

BRIEF DESCRIPTION OF THE DRAWINGS

FIG. 3 is a block diagram illustrating an example of a construction of a UWB demodulator;

DESCRIPTION OF THE PREFERRED EMBODIMENTS

Figure 1:
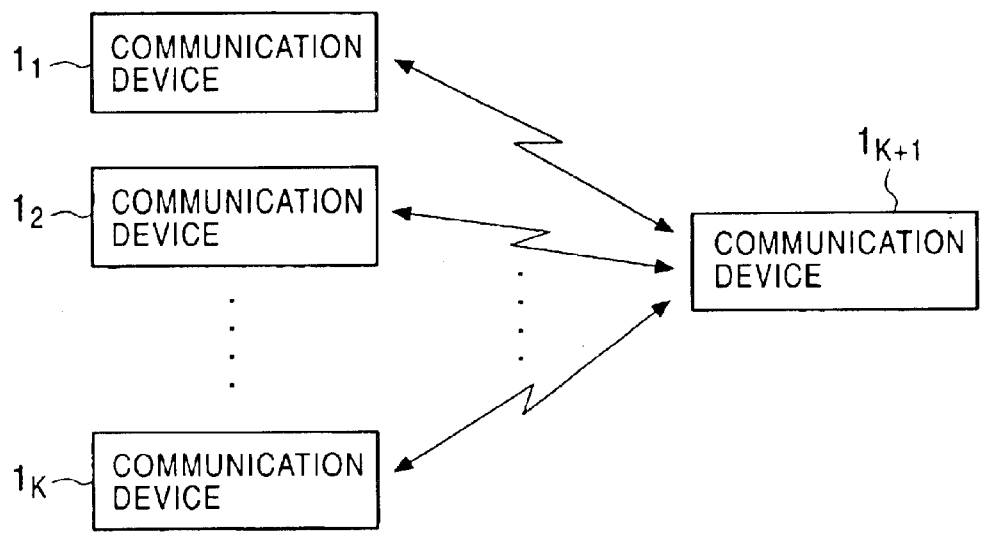
FIG. 1 is a diagram illustrating an example of a construction of a UWB communication system according to an embodiment of the present invention.

FIG. 1 illustrates an embodiment of a UWB communication system according to the present invention (herein, the term "system" refers to a logical set of apparatuses, the physical locations of which may or may not be within a single physical enclosure).

In the embodiment shown in FIG. 1, the UWB communication system includes K+1 communication devices $1_1$, $1_2$, ..., $1_{k+1}$. Each communication device $1_k$ modulates data to be transmitted by means of, for example, pulse position modulation and transmits the modulated signal as a radio transmission signal using a UWB communication technique through a transmission path 2. Each communication device $1_k$ also receives signals transmitted from the other communication devices $1_k$ through the transmission path 2 and demodulates the received signals into original data. Hereinafter, a user of the communication device $1_k$ is denoted as a user #k.

In the following discussion, among K+1 communication devices $1_1$, $1_2$, ..., $1_{k+1}$, a communication device $1_{k+1}$ is taken as an example, and the operation thereof is described. The communication device $1_{k+1}$ is capable of communicating with any of the other communication devices $1_1$, $1_2$, ..., $1_k$ of K users #1, #2, ..., #K by means of multiple access communication, in which a received signal corresponding to a signal transmitted from each user is demodulated into original data issued by the user.

As with the communication device $1_{k+1}$, each of the other communication devices $1_1$, $1_2$, ..., $1_k$ is capable of communicating with the other K communication devices by means of multiple access communication, although the communication device $1_{k+1}$ is taken as an example in the following discussion.

The UWB communication system such as that shown in FIG. 1 may be applied to, for example, a wireless LAN system or the like.

Figure 2:
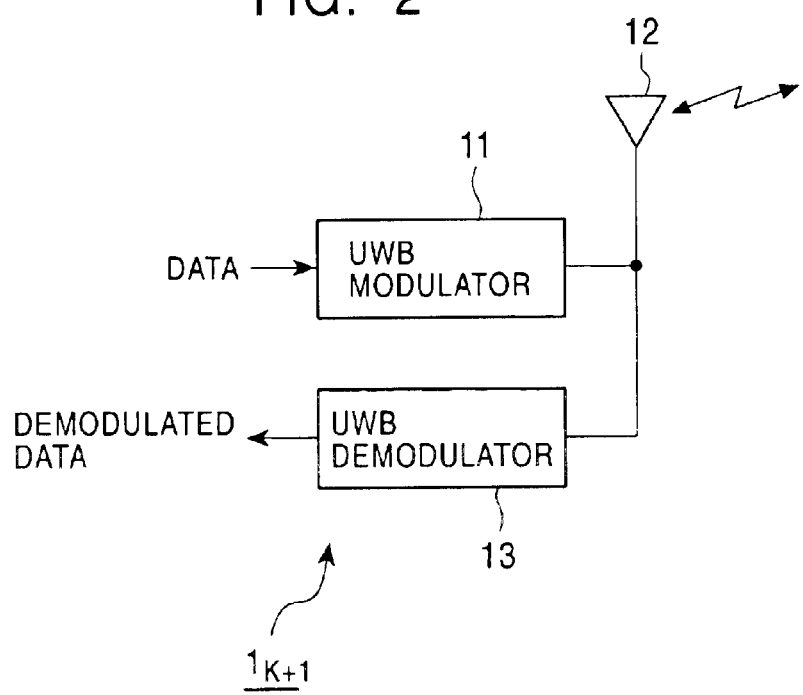
FIG. 2 is a block diagram illustrating an example of a construction of a communication device.

FIG. 2 illustrates an example of a construction of the communication device $1_{k+1}$ shown in FIG. 1. Each of the other communication devices $1_1$, $1_2$, ..., $1_k$ may be constructed in a similar manner to the communication device $1_{k+1}$.

The communication device $1_{k+1}$ includes a UWB modulator 11, an antenna 12, and a UWB demodulator 13.

Data to be transmitted is supplied to the UWB modulator 11. The UWB modulator 11 modulates the supplied data by means of pulse position modulation in which positions of pulses (impulses) are determined in accordance with the supplied data. The resultant modulated signal is supplied to the antenna 12 while performing time hopping.

Upon receiving the modulated signal from the UWB modulator 11, the antenna 12 transmits the modulated signal in the form of a radio wave. The antenna 12 also receives a radio wave from other communication devices 1 and supplies the received signal to the UWB demodulator 13.

The UWB demodulator 13 demodulates the received signal supplied from the antenna 12 in a manner described later and outputs the resultant demodulated data.

FIG. 3 shows an example of a construction of the UWB demodulator 13 shown in FIG. 2.

The UWB demodulator 13 includes a correlator 21 and a symbol detector 22.

The received signal is supplied from the antenna 12 to the correlator 21. The correlator 21 calculates the correlation of the received signal with respect to possible pulse positions for signals transmitted from the respective communication terminals $1_1$ to $1_k$. The resultant correlation is supplied to the symbol detector 22. On the basis of the correlation supplied from the correlator 21, and taking into account interference among the signals transmitted from the communication terminals $1_1$ to $1_k$, the symbol detector 22 demodulates the received signal into original data issued by the communication devices $1_1$ to $1_k$.

The process performed by the UWB demodulator 13 shown in FIG. 3 is described in further detail below on the basis of a model of a multi-user UWB communication system.

A multiple-access model in an additive white Gaussian noise environment has been proposed, for example, in the literatures Refs. 1 and 7 cited above. The multi-user UWB communication system can be modeled in part on the basis of that given in Ref. 1 or 7. However, the primary difference is the introduction of an equivalent vector model as described in "Sequence detection and equalization for pulse-position modulation" by J. R. Barry (Proc. IEEE Intl. Conf. Communications, pp. 1561–1565, May 1–5, 1994 (hereinafter denoted as "Ref. 13")).

Note that the equivalent vector model can be applied not only to the pulse position modulation but also to orthogonal modulation schemes. That is, although it is assumed that pulse position modulation is employed in the present embodiment, the process described below may also be applied to orthogonal modulation.

In the multiple-access model in an environment including additive white Gaussian noise, a received signal r(t) from user #K+1 (communication device $1_{k+1}$) can be expressed using transmitted signals $s^{(k)}(t)$ from user #k (communication devices $1_k$), as described below:

$$r(t) = \sum_{k=1}^{K} s^{(k)}(t) + n(t) \tag{1}$$

In this equation (1), t denotes time, and n(t) denotes zero-mean white Gaussian noise with a power spectral density of $N_o/2$, where $N_o$ is the mean power of white Gaussian noise.

The transmitted signal $s^{(k)}(t)$ of user #k in equation (1) can be expressed as follows:

$$s^{(k)}(t) = \sqrt{E_S^{(k)}} \sum_{n=1}^{N} \sum_{m=1}^{M} b_n^{(k,m)} a^m(t - nT_S - T_n^{(k)}) \tag{2}$$

wherein $E_S^{(k)}$ denotes symbol energy of the transmitted signal from user #k. Herein, it is assumed that $E_S^{(1)} = E_S^{(2)} = ..., = E_S^{(k)} = E_S$, although the above assumption is not necessarily needed, and the invention may also be applied to non-uniform signal energies.

In equation (2), N denotes the number of symbols transmitted by each user #k (the number of symbols detected at a time in detection of a symbol sequence), and $T_S$ denotes a symbol transmission repetition period for each user #k. Thus, $1/T_S$ represents the symbol rate, which is generally referred to as the pulse repetition frequency (RPF) in the art of UWB communication.

In equation (2), M denotes the unit symbol size. In the case of the pulse position modulation, M indicates the number of intervals included in each unit period with a predetermined length. Positions corresponding to respective M intervals included in each unit period are called chips (strictly speaking, M intervals are called chips). In the case where each symbol includes M chips and a pulse is placed only in one of the M chips depending on data to be transmitted, the number of bits transmitted per symbol is given by $\log_2 M$.

In equation (2), $b_n^{(k,m)}$ becomes 1 when a pulse is placed at an mth position of an nth symbol of the transmitted signal of user #k, and becomes 0 when no pulse is placed at that position. Thus, a vector $b_n^k$ including elements $b_n^{(k,m)}$, such as $[b_n^{(k,1)}, b_n^{(k,2)}, \ldots, b_n^{(k,M)}]^T$ (superscript T represents transpose), represents an nth symbol of the transmitted signal from the user #k.

Herein, it is assumed that only one of M elements $b_n^{(k,m)}$ in the vector $b_n^{(k)}$ is 1, while the remaining M−1 elements are 0. That is, a pulse is placed only at one of M positions in each unit period, depending on data to be transmitted. More specifically, when j (j=0, 1, ..., M−1) is data to be transmitted, only (j+1)th element $b_n^{(k,j+1)}$ is set to 1, and the other elements are set to 0. Note that, alternatively, a plurality of pulses may be placed in each unit period depending on data to be transmitted.

In equation (2), $a^{(m)}(t)$ represents the waveform of a pulse at a position m. The pulse $a^{(m)}(t)$ has unit signal energy and satisfies the following equation.

$$\int_{-\infty}^{\infty} a^{(m)}(t) a^{(m')}(t) dt = \delta_{m,m'} \quad (3)$$

where $\delta_{m,m}$ is the kronecker delta function.

More specifically, the pulse $a^{(m)}(t)$ is represented by the following equation:

$$a^{(m)}(t) = w_{rec}(t - mT_p) \quad (4)$$

As can be seen from equation (4), the possible positions at which pulses $a^{(m)}(t)$ can be placed in each unit period are spaced from each other by a time interval $T_p$. In other words, the time $T_p$ represents time intervals at which each unit period is divided into chips (hereinafter, $T_p$ will be referred to as a chip interval).

The signal $w_{rec}(t)$ that defines the pulse $a^{(m)}(t)$ has a very short pulse waveform with a width equal to or smaller than 1 ns. For example, as described in Ref. 7, the signal $w_{rec}(t)$ can be given by the following equation:

$$w_{rec}(t) = \sqrt{\frac{8}{3}} \left[ 1 - 4\pi \left( \frac{t}{\tau_{uwb}} \right)^2 \right] \exp\left[ -2\pi \left( \frac{t}{\tau_{uwb}} \right)^2 \right] \quad (5)$$

wherein $\tau_{uwb}$ is a parameter that determines the pulse width, and time t is in units of nano-seconds (ns). For example, when $\tau_{uwb}=0.7531$ ns, the with of the pulse $w_{rec}(t)$ becomes about 1.5 ns, as is discussed, for example, in a paper entitled "Performance of ultra wideband time-shift-modulated signals in the indoor wireless impulse radio channel" by F. Ramirez-Mireles, M. Z. Win, R. A. Scholtz and M. A. Barnes (Proc. Asilomar Conf. on Signal, Systems and Computers, pp. 192–196, Nov. 2–5, 1997 (hereinafter denoted as "Ref. 14")), and a paper entitled "Performance of Equicorrelated ultra-wideband pulse-position-modulated signals in the indoor wireless impulse radio channel" by F. Ramirez-Mireles and R. A. Scholtz (Proc. IEEE Pacific Pim Conf. on Communications, Computers and Signal Processings, pp. 640–644, Aug. 20–22, 1997 (hereinafter denoted as "Ref. 15")).

Strictly speaking, the pulse width refers to a time duration during which the pulse $w_{rec}(t)$ can be regarded as existing.

In equation (5), the factor $\sqrt{8/3}$ has been introduced to normalize the energy of the pulse $w_{rec}(t)$ such that $$\int_{-\infty}^{\infty} (w_{rec}(t))^2 dt = 1.$$

The correlation (autocorrelation) $\rho(t)$ among pulses $w_{rec}(t)$ is given as:

$$\rho(t) = \int_{-\infty}^{\infty} w_{rex}(t-u) w_{rex}(u) du \quad (6)$$

As described, for example, in Ref. 9, the autocorrelation $\rho(t)$ given by equation (5) can be approximated as follows:

$$\rho(t) = e^{-\alpha} \left[ 1 - 4\alpha + \frac{4}{3}\alpha^2 \right] \quad (7)$$

where $\alpha = \pi(t/\tau_{uwb})^2$.

In equation (2), $T_n^{(k)}$ represents a TH (time-hopping) time for a symbol of user #k. For example, when symbols are transmitted from a user #k to a user #K+1, the timing of transmitting symbols is subjected to time hopping in accordance with a pseudorandom number. More specifically, an nth symbol from the user #k is transmitted at a time shifted from a time $nT_S$ by the TH time $T_n^{(k)}$. The time hopping is performed to reduce possible collisions with symbols transmitted by other users #k'.

The TH time $T_n^{(k)}$ is represented using $T^{(k)}$ and $T'_n^{(k)}$ such that $T_n^{(k)} = T^{(k)} + T'_n^{(k)}$. Herein, $T^{(k)}$ can take a value within the range of $0 \leq T^{(k)} < T_S$ and represents a delay of a symbol transmitted from user #k relative to a symbol delay $T^{(1)}$ for user #1 (that is, $T^{(1)}=0$). Time $T'_n^{(k)}$ represents pseudo noise that determines time hopping and can take a value within the range of $0 \leq T'_n^{(k)} < T_{TH,max}$. Herein, it is required that $T_{TH,max} \leq T_S$, and it is also required that the minimum difference $T_S - T_{TH,max}$ should be smaller than a sample-and-hold time of the S/H (sample-and-hold) circuit 55 in a correlator $41_m$ (FIG. 7) that will be described later and also than an interval between a pulse placed in a certain symbol and a pulse placed at a next symbol.

Herein, for the purpose of simplicity, it is assumed that $T_{TH,max} = T_S$ and it is also assumed that the time-hopping sequence $\{T_n^{(k)}\}$ is modeled as a sequence of independent and identically distributed continuous random variables each uniformly distributed over the range from (equal to or greater than) 0 to (smaller than) $T_{TH,max}$. In practice, however, the time-hopping sequence $\{T^{(k)}\}$ are discretized over chip intervals.

Figure 4A:
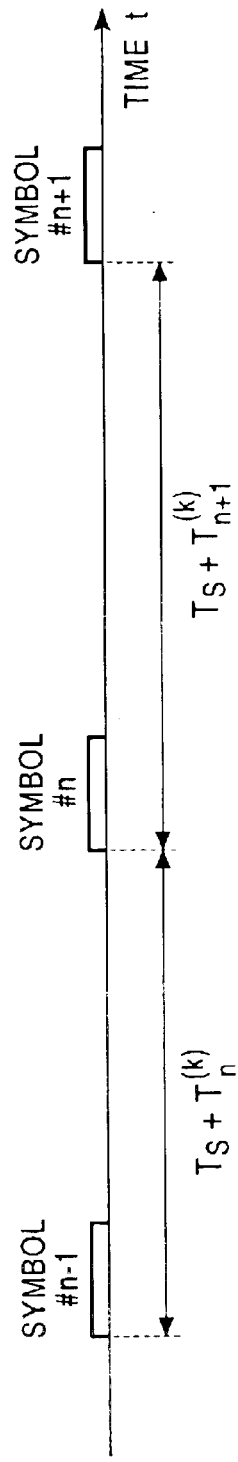
FIG. 4 a diagram illustrating a signal transmitted by means of UWB communication technology.

As can be seen from equation (2), a signal $s^{(k)}(t)$ is transmitted from a user #k as shown in FIG. 4A.

In FIG. 4A, a symbol #n is transmitted from the user #k when a period of time equal to $T_S + T_n^{(k)}$ has elapsed since the transmission of a previous symbol #n−1.

Figure 4B:
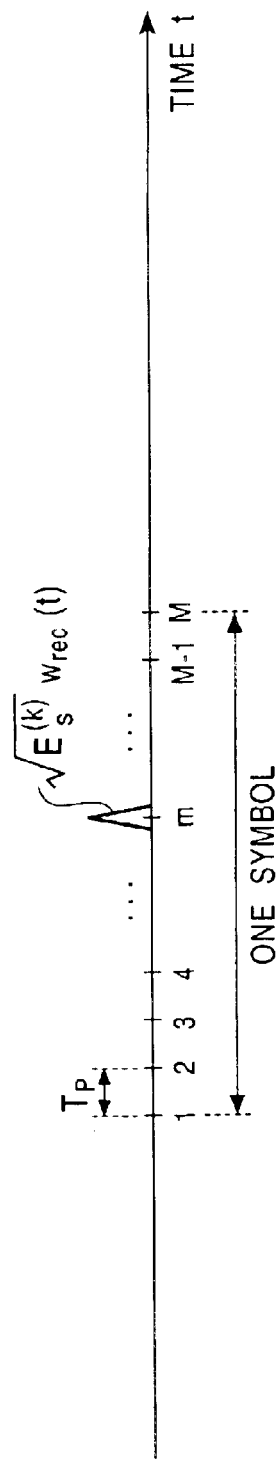

In the symbol #n, as shown in FIG. 4B, a pulse represented by $\sqrt{(E_S^{(k)})} w_{rec}(t)$ is placed at a position m of M positions spaced from each other by $T_p$, wherein the position m depends on the data being transmitted.

Referring again to FIG. 3, the correlator 21 calculates the correlation of the received signal r(t) represented by equation (1) with respect to possible pulse positions for signals transmitted from the respective users #1 to #K.

For a certain user #k' of the plurality of users #1 to #K, a pulse placed at an m'th position in an n'th symbol (such a pulse is referred to as a local pulse) of a signal transmitted from the user #k' can be represented as $a^{(m')}(t - n'T_S - T_n^{(k')})$. Thus, for the user #k', the correlator 21 calculates the correlation $y_{n'}^{(k',m')}$ in accordance with the following equation:

$$y_{n'}^{(k',m')} = \int_{-\infty}^{\infty} r(t) a^{(m')}(t - n'T_S - T_{n'}^{(k')}) dt \qquad (8)$$

For the user #k', the correlation $y_{n'}^{(k',m')}$ represented by equation (8) is calculated for all positions m'. Herein, we introduce an M×1 vector $y_{n'}^{(k')}$ whose elements are given by correlations $y_{n'}^{(k',1)}, y_{n'}^{(k',2)}, \ldots, y_{n'}^{(k',M)}$ calculated for the respective positions m'=1, 2, ..., M. That is, the M×1 vector $y_{n'}^{(k')}$ can be represented as follows:

$$y_{n'}^{(k')} = \left( [y_{n'}^{(k',1)}, \ldots, y_{n'}^{(k',M)}] \right)^T \qquad (9)$$

Because symbol transmission between a certain user and another user is performed asynchronously, the correlations $y_{n'}^{(1)}, y_{n'}^{(2)}, \ldots, y_{n'}^{(k')}$ associated with the respective users outputted from the correlator 21 are not necessarily deterministic with respect to the time phase, and the correlations should be treated as stochastic variables. Therefore, hereinafter, values (such as $y_{n'}^{(k',m')}$ or $y_{n'}^{(k')}$) outputted from the correlator 21 will be referred to as correlation statistics.

The correlation statistic $y_{n'}^{(k',m')}$ in equation (8) can be determined by substituting the received signal r(t) given by equation (1) into equation (8). Thus, the correlation statistic $y_{n'}^{(k',m')}$ is given as:

$$y_{n'}^{(k',m')} = \rho^{n',k',m'T} Ab + \eta^{n',k',m'} \qquad (10)$$

where $\rho^{n',k',m'}$ is the correlation vector between the local pulse $a(m')(t-n'T_S - T_{n'}^{(k')})$ and the signals $s^{(1)}(t)$ to $s^k(t)$ transmitted from the users #1 to #K, and the correlation vector $\rho^{n',k',m'}$ can be represented in the form of an NKM×1 vector as shown below:

$$\rho^{n',k',m'} = \left[ \rho_1^{n',k',m'T}, \ldots, \rho_N^{n',k',m'T} \right]^T \qquad (11)$$

The correlation vector $\rho^{n',k',m'}$ in equation (11) includes N elements in the form of vectors $\rho_n^{n',k',m'}$. Each vector $\rho_n^{n',k',m'}$ is a correlation vector between a local pulse $a^{m'}(t-n'T_S-T_{n'}^{(k')})$ and an nth symbol in signals $s^1(t)$ to $s^{(k)}(t)$ transmitted from users #1 to #K, and is represented in the form of a KM×1 vector as shown below:

$$\rho_n^{n',k',m'} = \left[ \rho_{n,1}^{n',k',m'T}, \ldots, \rho_{n,K}^{n',k',m'T} \right]^T \qquad (12)$$

The correlation vector $\rho_n^{n',k',m'}$ in equation (12) includes N elements in the form of vectors $\rho_n^{n',k',m'}$. Each vector $\rho_n^{n',k',m'}$ is a correlation vector between a local pulse $a^{(m')}(t-n'T_S-T_{n'}^{(k')})$ and an nth symbol of a signal $s^{(k)}(t)$ transmitted from a user #k, and is represented in the form of an M×1 vector as shown below:

$$\rho_{n,K}^{n',k',m'} = \left[ \rho_{n,k,1}^{n',k',m'}, \ldots, \rho_{n,k,M}^{n',k',m'} \right]^T \qquad (13)$$

Each element $\rho_{n,k,m}^{n',k',m'}$ of the correlation vector $\rho_{n,k}^{n',k',m'}$ in equation (13) represents the correlation between a local pulse $a^{(m')}(t-n'T_S-T_{n'}^{(k')})$ and a pulse at an mth position of an nth symbol of a signal s(k)(t) transmitted from a user #k, and can be calculated in accordance with equation (14) shown below, wherein the correlation $\rho_{n,k,m}^{n',k',m'}$ in this equation (14) can be calculated in accordance with equations (4) to (7) described above.

$$\rho_{n,k,m}^{n',k',m'} = \int_{-\infty}^{\infty} a^{(m)}(t - nT_S - T_n^{(k)}) a^{(m')}(t - n'T_S - T_{n'}^{(k')}) dt \qquad (14)$$

In equation (10), the matrix A is a KMN×KMN diagonal matrix representing the signal energies for all symbols and all users, and can be represented as follows:

$$A = \text{diag}(A_1^T, \ldots, A_N^T) \qquad (15)$$

where each element $A_n$ of the matrix A is a KM×1 vector, and diag($A_n$) denotes a diagonal matrix whose diagonal elements are given by vectors $A_n$.

Each vector $A_n$ that is an element of the matrix A in equation (15) can be represented by equation (16) shown below.

$$A_n = \left[ A_n^{(1)T}, \ldots, A_n^{(K)T} \right]^T \qquad (16)$$

In equation (16), each element $A_n^k$ of the vector $A_n$ is a M×1 vector having identical elements $E_S^k$ as shown in equation (17).

$$A_n^{(k)} = [E_S^{(k)}, E_S^{(k)}, \ldots, E_S^{(k)}]^T \qquad (17)$$

In equation (10), the vector b is an NKM×1 vector given by equation (18) representing possible pulse positions for a symbol of each user, that is, possible symbol values.

$$b = [b_1^T, \ldots, b_N^T]^T \qquad (18)$$

Each element $b_n$ of the vector b in equation (18) is a KM×1 vector representing possible values of an nth symbol transmitted from each user, and is given by equation (19) shown below.

$$b_n = \left[ b_n^{(1)T}, \ldots, b_n^{(K)T} \right]^T \qquad (19)$$

Each element $b_n^k$ of the vector $b_n$ in equation (19) is an M×1 vector representing possible values of an nth symbol transmitted from a user k, and is given by equation (20) shown below.

$$b_n^{(k)} = [b_n^{(k,1)}, \ldots, b_n^{(k,M)}]^T \qquad (20)$$

In equation (10), $\eta^{n',k',m'}$ is a Gaussian random variable with a mean value of 0 and a variance of $N_o/2$.

If the collection of correlation statistics $y_{n'}^{(k')}$ for all symbols and all users, which are represented by equation (9) and outputted from the correlator 21, is denoted by a vector y, then equation (10) can be rewritten using this correlation statistic y as follows:

$$y = RAb + \eta \qquad (21)$$

where the vector b is defined in equations (18) to (20).

The vector y in equation (21) is a KMN×1 vector including N vectors given by the following equation:

$$y = [y_1^T, \ldots, y_N^T]^T \qquad (22)$$

In equation (22), each element of the vector y, that is, the vector $y_{n'}$, represents a correlation statistic of an nth symbol for all users, and the vector $y_{n'}$ is a KM×1 vector represented by the following equation:

$$y_{n'} = \left[ y_{n'}^{(1)T}, \ldots , y_{n'}^{(K)T} \right]^T \tag{23}$$

In equation (23), the vector $y_{n'}$ includes elements in the form of vectors $y_{n'}^{(k')}$ defined in equation (9).

In equation (21), R is an NKM×NKM correlation matrix, which is defined as follows:

$$R = \left[ \rho^{1T}, \ldots , \rho^{NT} \right]^T \tag{24}$$

In equation (24), each element $\rho^{n'}$ of the correlation matrix R is a KM×NKM matrix representing the correlation between a local pulse and an n'th symbol for all users, and is given by the following equation:

$$\rho^{n'} = \left[ \rho^{n',1T}, \ldots , \rho^{n',KT} \right]^T \tag{25}$$

In equation (25), each element $\rho^{n',k'}$ of the matrix $\rho^{n'}$ is an M×NKM matrix representing a local pulse and an n'th symbol of a signal transmitted from a user #k', and is given by the following equation:

$$\rho^{n',k'T} = \left[ \rho^{n',k',1T}, \ldots , \rho^{n',k',MT} \right]^T \tag{26}$$

In equation (26), each element $\rho^{n',k',m'}$ of the matrix $\rho^{n',k'}$ is defined in equation (11).

η in equation (21) corresponds to an $\eta^{n',k',m'}$ in equation (10) and defined by a vector (noise vector) given by the following equation:

$$\eta = [\eta_1^T, \ldots , \eta_N^T]^T \tag{27}$$

where the vector $\eta_{n'}$ is defined as follows:

$$\eta_{n'} = \left[ \eta_{n'}^{(1)T}, \ldots , \eta_{n'}^{(K)T} \right]^T \tag{28}$$

where the vector $\eta_{n'}^{(k')}$ is defined as follows:

$$\eta_{n'}^{(k')} = [\eta^{n',k',1}, \ldots , \eta^{n',k',M}]^T \tag{29}$$

Note that elements of $\eta_n^{k'}$ in equation (29) are given by $\eta^{n',k',m'}$ in equation (10).

The correlator 21 shown in FIG. 3 calculates the correlation statistic y in equation (21) (in practice, the correlator 21 calculates the correlation statistic in accordance with equation (8), which results in the same correlation statistic according to equation (21). To this end, as shown in FIG. 5, the correlator 21 includes as many K correlator banks $31_1$ to $31_K$ as there are multi-access users and also includes switches $32_1$ to $32_K$ disposed at the outputs of the respective correlator banks $31_1$ to $31_K$.

The received signal r(t) is supplied to each correlator bank $31_{k'}$. The correlator bank $31_{k'}$ calculates the correlator statistic $y_{n'}^{(k')}$ in equation (9) using the received signal r(t) and the local pulse $a^{(m')}(t-n'T_S-T_{n'}^{(k')})$ in accordance with equation (8).

The correlation statistic $y_{n'}^{(k')}$ outputted from the correlator bank $31_{k'}$ is supplied to the switch $32_{k'}$. The switch $32_{k'}$ is normally in an off-state and is turned on at a time $t=(n'+1)T_S$ so that the correlation statistic $y_n^{(k')}$ outputted from the correlator bank $31_{k'}$ is supplied to the symbol detector 22 (FIG. 3) disposed at the following stage via the switch $32_{k'}$ at $t=(n'+1)T_S$.

Figure 5:
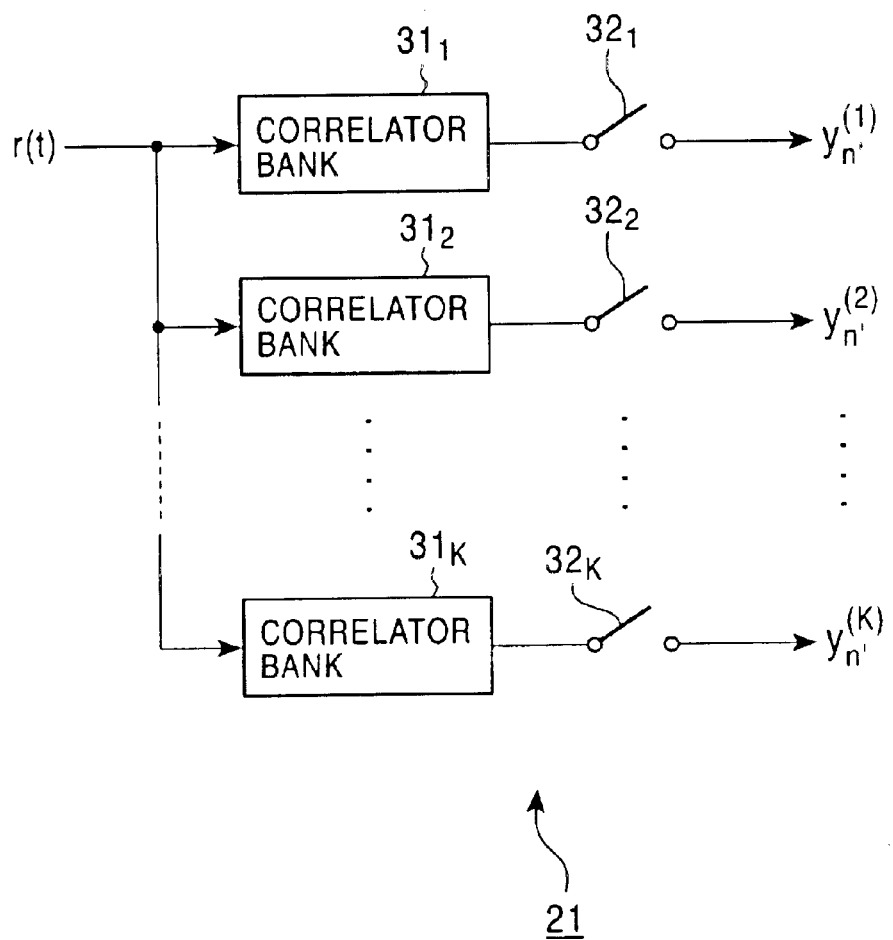
FIG. 5 is a block diagram illustrating an example of a construction of a correlator.
Figure 6:
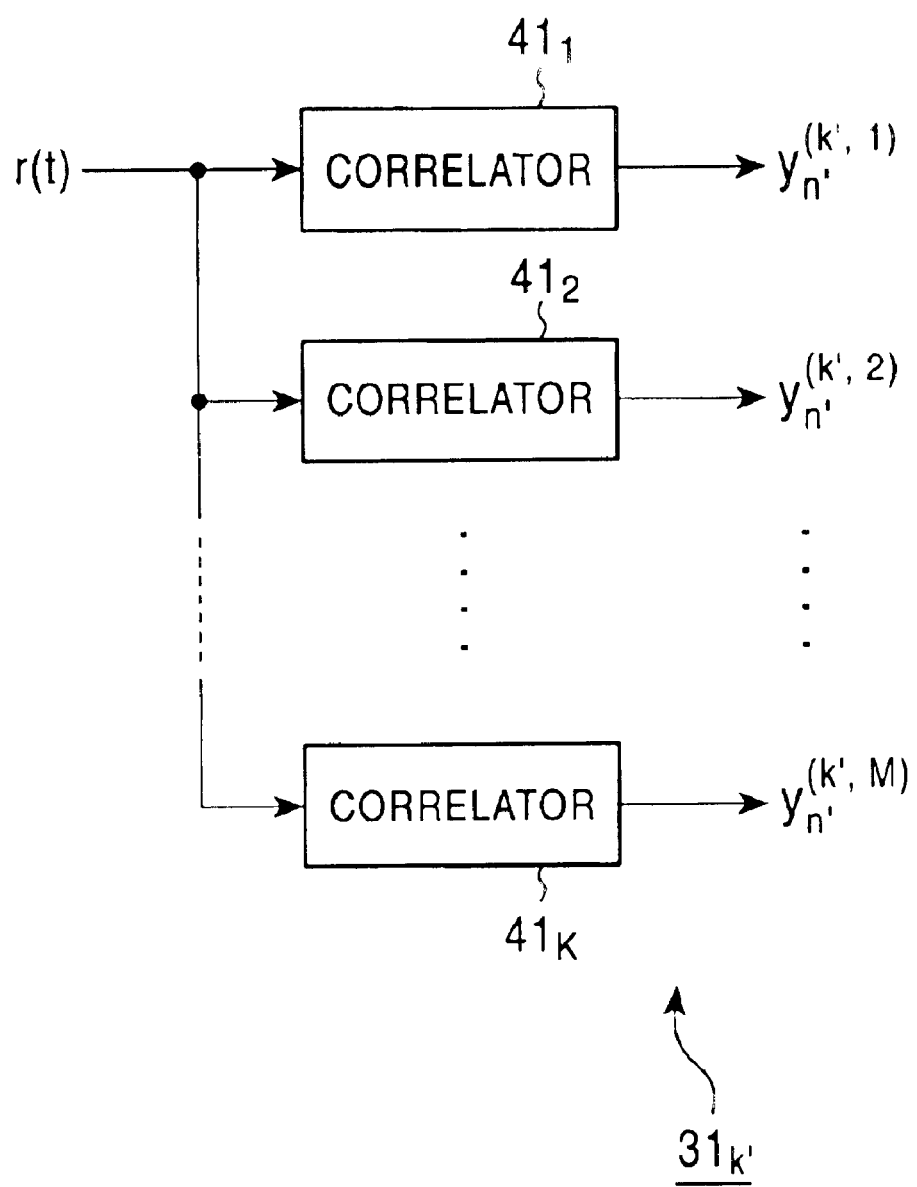
FIG. 6 is a block diagram illustrating an example of a construction of a correlator bank.

FIG. 6 shows an example of a construction of the correlator bank $31_{k'}$ shown in FIG. 5.

The correlator bank $31_{k'}$ includes as many correlators $41_1$ to $41_m$ as there are M possible pulse positions within a unit period during which a symbol is transmitted.

The received signal r(t) is supplied to each correlator $41_{m'}$. The correlator $41_{m'}$ calculates the correlator statistic $y_{n'}^{(k',m')}$ in equation (8) using the received signal r(t) and the local pulse $a^{(m')}(t-n'T_S-T_{n'}^{(k')})$ in accordance with equation (8).

Figure 7:
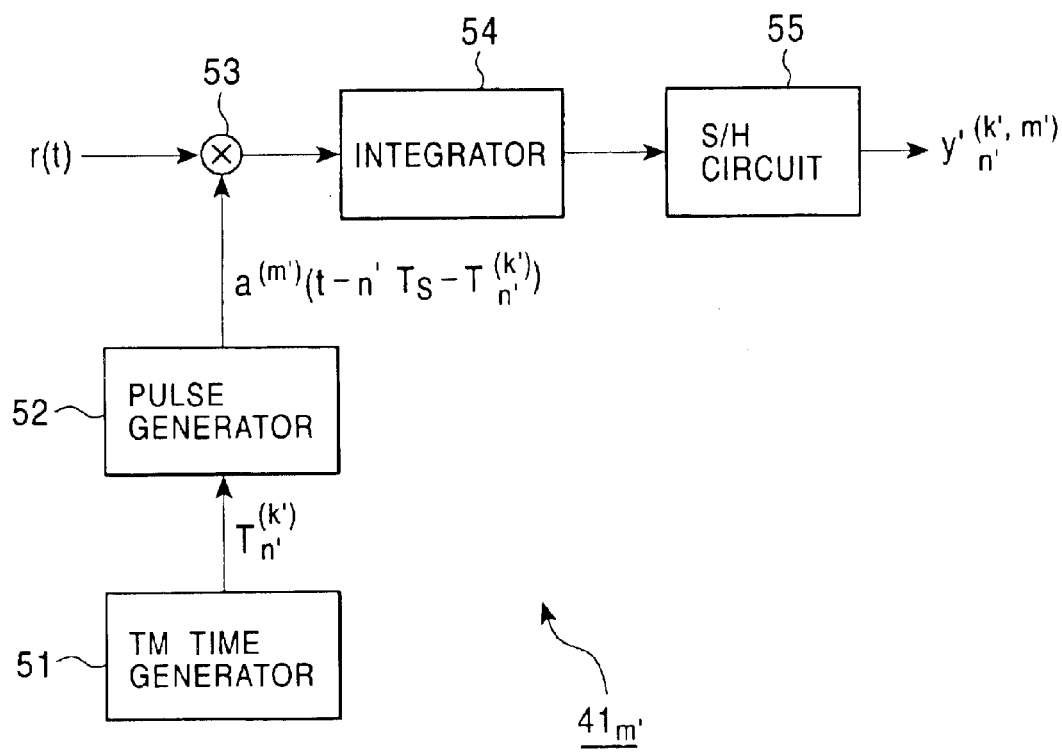
FIG. 7 is a block diagram illustrating another example of a construction of a correlator.

FIG. 7 shows an example of a construction of the correlator $41_{m'}$ shown in FIG. 6.

A TH (time-hopping) time generator 51 generates a TH time $T_{n'}^{(k')}$ and supplies it to a pulse generator 52. On the basis of the TH time $T_{n'}^{(k')}$ supplied from the TH time generator 51, the pulse generator 52 generates a local pulse $a^{(m')}(t-n'T_S-T_{n'}^{(k')})$ and supplies it to a multiplier 53.

In addition to the local pulse $a^{(m')}(t-n'T_S-T_{n'}^{(k')})$ supplied from the pulse generator 52, the received signal r(t) is also supplied to the multiplier 53. The multiplier 53 calculates the product of the received signal r(t) and the local pulse $a^{(m')}(t-n'T_S-T_{n'}^{(k')})$ thereby determining $r(t)a^{(m')}(t-n'T_S-T_{n'}^{(k')})$ that is to be integrated with respect to time as shown in equation (8). The result is supplied to an integrator 54.

The integrator 54 integrates the output of the multiplier 53 with respect to time in accordance with equation (8). The resultant integral value to an S/H circuit 55.

The S/H circuit 55 samples and holds the output of the integrator 54 at a time indicated by the TH time $T_{n'}^{(k')}$. The sampled and held value is outputted as the correlation statistic $y_{n'}^{(k',m')}$ represented in equation (8).

Figure 8:
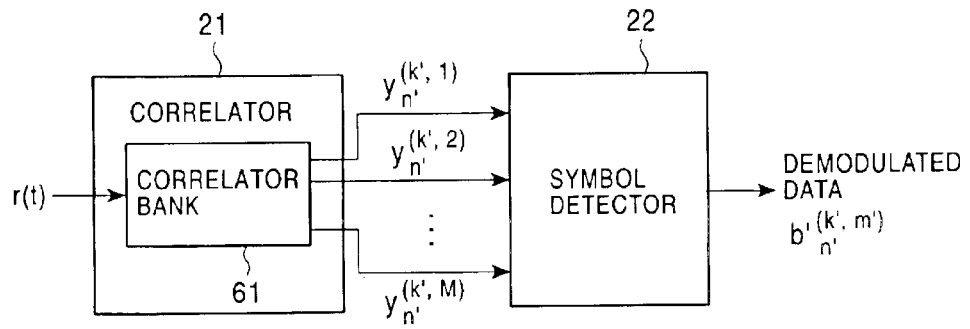
FIG. 8 is a block diagram illustrating an example of a construction of a single-user demodulator.

In the case where the UWB demodulator 13 shown in FIG. 3 is constructed as a single-user demodulator, the correlator 21 includes, as shown in FIG. 8, only one correlator 61 similar to the correlator bank $31_{k'}$ shown in FIG. 6.

In this case, the output of the correlator 21 represents the correlation statistic $y_{n'}^{(k',m')}$ ($=[y_{n'}^{(k',1)}, y_{n'}^{(k',2)}, \ldots , y_{n'}^{(k',M)}]$) associated with only a particular user #k', and the symbol detector 22 at the following stage detects a symbol on the basis of the correlation statistic $y_{n'}^{(k',m')}$ associated with that user #k'.

In this case, because only the correlation statistic $y_{n'}^{(k',m')}$ of the single user #k' is supplied to the symbol detector 22, it is impossible to take into account the correlation statistics for other users, that is, interference with other users, in the symbol detection. That is, the symbol detector 22 estimate a value $b_{n'}^{(k',m')}$ for a symbol from a user #k' without taking into account interference with other users, in accordance with a determination criterion given by the following equation.

$$b_{n'}^{\prime(k',m')} = \begin{cases} 1, & \text{if } y_{n'}^{(k',m')} = \max(y_{n'}^{(k')}), \\ 0, & \text{otherwise.} \end{cases} \tag{30}$$

That is, in the case where the UWB demodulator 13 is constructed as the single-user demodulator, the symbol detector 22 detects a maximum value $y_{n'}^{(k',m(max))}$ from the correlation statistics $y_{n'}^{(k',1)}, y_{n'}^{(k',2)}, \ldots , y_{n'}^{(k',M)}$, and m(max) corresponding to the detected maximum value is outputted as demodulated data.

Figure 9:
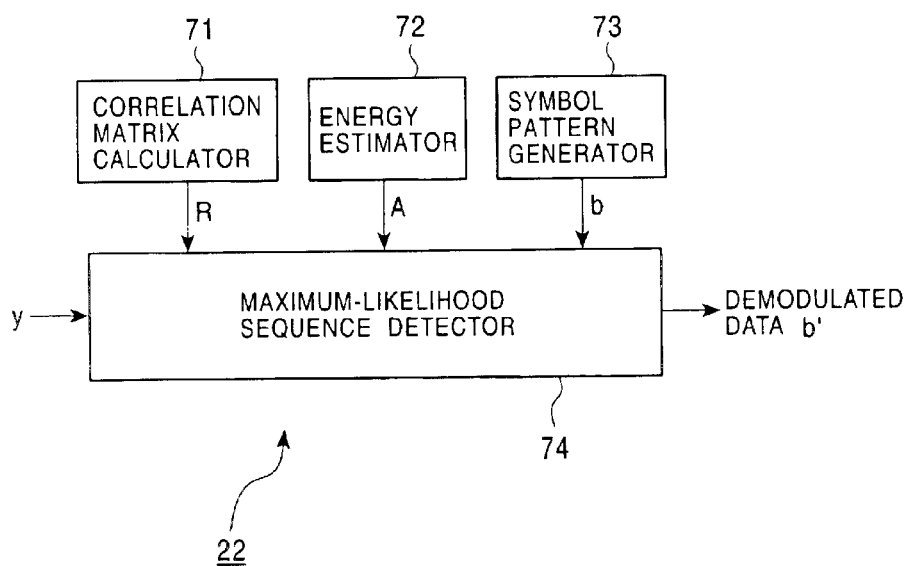
FIG. 9 is a block diagram illustrating an example of a construction of a symbol detector functioning as an optimum demodulator.

In contrast, in the case where the UWB demodulator 13 is constructed as an optimum multi-user demodulator (optimum detector), the symbol detector 22 may be constructed, for example, as shown in FIG. 9.

In the example shown in FIG. 9, the symbol detector 22 includes a correlation matrix calculator 71, an energy estimator 72, a symbol pattern generator 73, and a maximum-likelihood sequence detector 74.

The correlation matrix calculator 71 calculates the correlations among pulses at possible positions for signals transmitted from users in accordance with equation (14) thereby determining the correlation matrix R including the calculated correlations as represented in equation (24), and supplies the result to the maximum-likelihood sequence detector 74. In the above calculation of the correlation matrix R performed by the correlation matrix calculator 71 in accordance with equation (14), time information such as $T_p$, $T_s$, and $T_n^k$, and the number M of intervals in a unit symbol period is needed. The information about these (correlation matrix calculation information) is assumed to be given to the correlation matrix calculator 71.

The energy estimator 72 estimates the energies $E_s^{(k)}$ of the transmitted signals for respective users #k and determines the matrix A (energy matrix) including the estimated energies $E_s^k$ as elements as shown in equation (15). The resultant energy matrix A is supplied to the maximum-likelihood sequence detector 74. In the present embodiment, as described above, the energies $E_s^{(1)}$, $E_s^{(2)}$, ..., $E_s^{(k)}$ of the signals transmitted from the respective users are assumed to have an identical value $E_s$.

The symbol pattern generator 73 determines possible pulse positions for symbols from the respective users. That is, the symbol pattern generator 73 determines the vector b (pattern vector), which is defined in equation (18) and which represents a possible symbol pattern. The resultant pattern vector is supplied to the maximum-likelihood sequence detector 74.

To the maximum-likelihood sequence detector 74, the correlation statistic (vector) y outputted from the correlator 21 is also supplied in addition to the correlation matrix R outputted from the correlation matrix calculator 71, the energy matrix A outputted from the energy estimator 72, and the pattern vector b outputted from the symbol pattern generator 73, as described earlier. Using information about these, the maximum-likelihood sequence detector 74 determines the maximum-likelihood sequence thereby determining an estimated symbol sequence (vector) $b'^{(1)}$, $b'^{(2)}$, ..., $b'^{(k)}$ and outputs the resultant estimated symbol sequence as demodulated data.

More specifically, the maximum-likelihood sequence detector 22 determines a maximum-likelihood symbol sequence (vector) $b'=[b'^{(1)}, b'^{(2)}, \ldots, b'^{(K)}]$ for the users #1 to #K, using the correlation statistic y, the correlation matrix R, the energy matrix A, and the pattern vector b, in accordance with a determination criterion given by the following equation.

$$b' = \arg\min_b \|y - RAb\|^2 \quad (31)$$

In equation (31), arg min(x) with respect to b represents an operation of determining b that results in minimization of x.

In accordance with equation (31), of $M^{KN}$ pattern vectors b, a vector that gives a minimum value of the norm $\|y-RAb\|^2$ is employed as the molst-likelihood symbol sequence b'.

Figure 10:
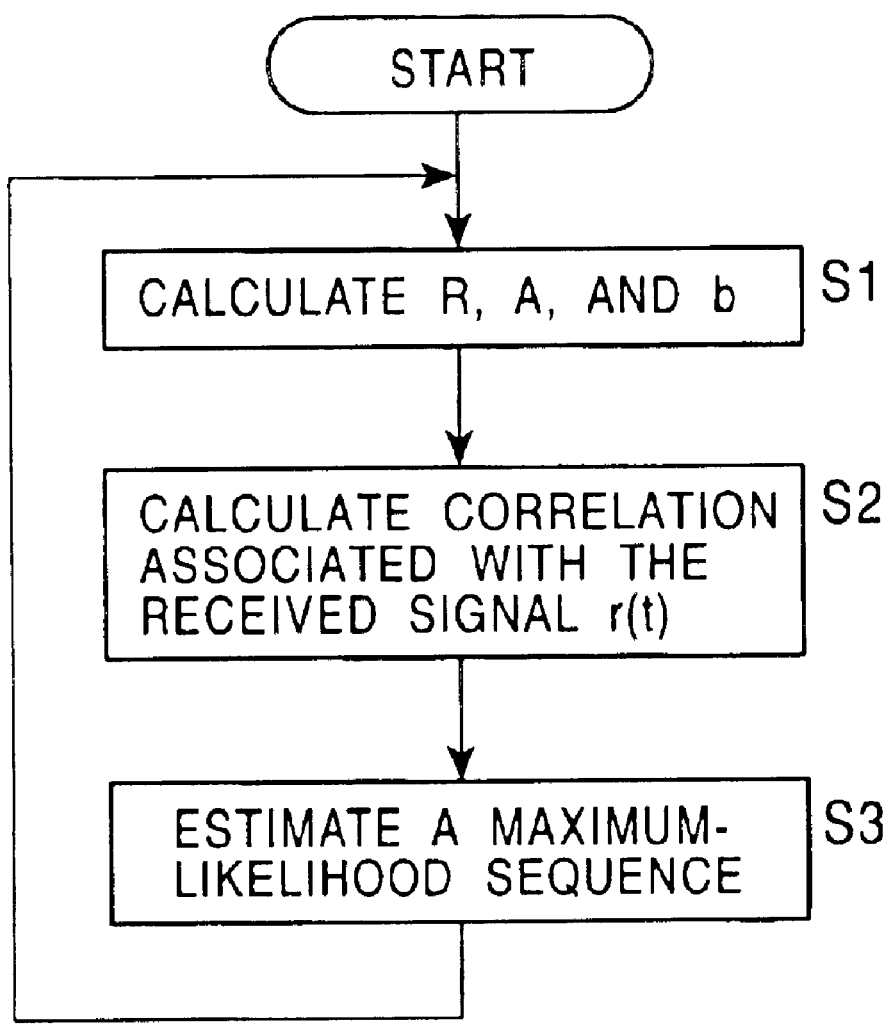
FIG. 10 is a flow chart showing the process performed by the UWB demodulator functioning as the optimum demodulator.

In the case where the UWB demodulator 13 is constructed as the optimum multi-user demodulator as shown in FIG. 9, the UWB demodulator 13 performs a process in accordance with a procedure shown in the form of a flow chart in FIG. 10.

First, in step S1, the correlation matrix calculator 71 determines the correlation matrix R, and the energy estimator 72 determines the energy matrix A. Furthermore, the symbol pattern generator 73 determines the pattern vector b and supplies the result to the maximum-likelihood sequence detector 74.

Thereafter, in step S2, the correlator 21 determines the correlation between the received signal r(t) and the local pulses. The correlation statistic y obtained as a result is supplied to the maximum-likelihood sequence detector 74.

Using the correlation statistic y, the correlation matrix R, the energy matrix A, and the pattern vector b, the maximum-likelihood sequence detector 74 determines the maximum-likelihood sequence $b'=[b'^{(1)}, b'^{(2)}, \ldots, b'^{(k)}]$ for the users #1 to #K in accordance with a determination criterion given by equation (31) and outputs the result as the demodulated data.

Thereafter, the process returns to step S2 to perform the above-described operation for the next received signal r(t).

Although the UWB demodulator 13 can be constructed in the form of an optimum multi-user demodulator (optimum detector) as described above, the UWB demodulator 13 may also be constructed in the form of a suboptimum multi-user demodulator (suboptimum detector).

That is, the UWB demodulator 13 may detect optimum symbols (sequence) from the respective users by jointly demodulating the signals from all users on the basis of all correlation statistics $y_{n'}^{(1)}, y_{n'}^{(2)}, \ldots, y_{n'}^{(k)}$ of all users taking into account interference among users, or may detect suboptimum symbols (sequence) by removing interference components among users (multiple-access interference) from the correlation statistics $y_{n'}^{(1)}, y_{n'}^{(2)}, \ldots, y_{n'}^{(k)}$ using the correlation statistics $y_{n'(1)}, y_{n'}^{(2)}, \ldots, y_{n'}^{(k)}$ of all users.

The UWB demodulator 13 may be constructed in the form of a suboptimum multi-user demodulator, for example, using a decorrelator.

The decorrelator is analogous to a zero-forcing linear detector for intersymbol interference limited channels in single-user systems. The decorrelator projects the correlation statistic y onto a signal space having no multiple-access interference (MAI) by means of a linear transformation in accordance with equation (32) shown below thereby determining the correlation statistic y' in the signal space.

$$y'=R^{-1}y \quad (32)$$

After determining the correlation statistic y' in the signal space having no multiple-access interference in the above-descried manner, a suboptimum symbol sequence $b'_{n'}^{(1,m)}$, $b'_{n'}^{(2,m)}, \ldots, b'_{n'}^{(k,m)}$ for the users #k to #K can be estimated in accordance with the determination criterion given by equation (30).

Figure 11:
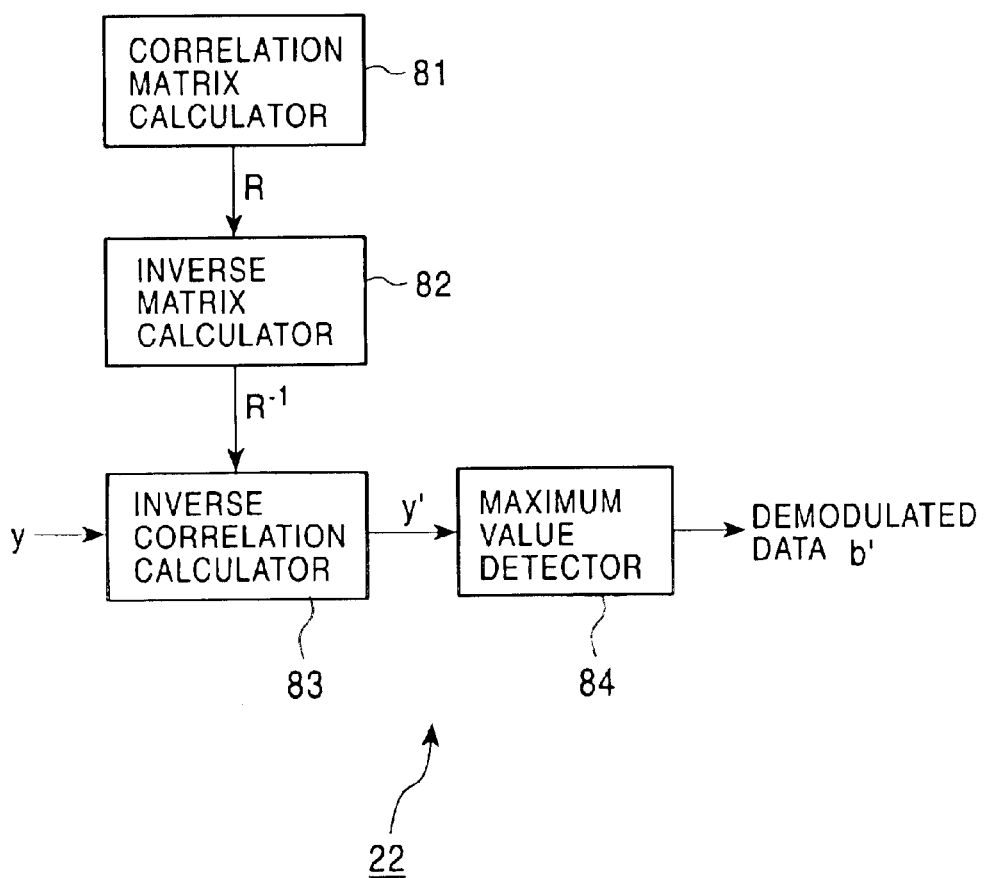
FIG. 11 is a block diagram illustrating a first example of a construction of a symbol detector functioning as a suboptimum demodulator.

FIG. 11 shows an example of a construction of the symbol detector 22 in the UWB demodulator 13 constructed as a suboptimum multi-user demodulator using a decorrelator.

As with the correlation matrix calculator 71 shown in FIG. 9, a correlation matrix calculator 81 calculates the correlation matrix and supplies the result to an inverse matrix calculator 82. The inverse matrix calculator 82 calculates the inverse matrix $R^{-1}$ of the correlation matrix R supplied from the correlation matrix calculator 81 (hereinafter, such an inverse matrix will be referred to as an inverse correlation matrix) and supplies the result to an inverse correlation calculator 83.

If the determinant of the correlation matrix R is equal to 0 or a very small value, which can occur when there is noise or a calculation error or when the correlation matrix R is not regular, the inverse matrix calculator 82 performs exception handling in which the inverse correlation matrix $R^{-1}$ is replaced by a generalized inverse matrix with a maximum square norm.

In addition to the inverse correlation matrix $R^{-1}$ outputted from the inverse matrix calculator 83, the correlation statistic y outputted from the correlator 21 is also supplied to the inverse correlation calculator 83. The inverse correlation calculator 83 converts the correlation statistic y into a correlation statistic y' in a signal space including no multiple-access interference, in accordance with equation (32), that is, by means of a linear transformation using the inverse correlation matrix $R^{-1}$. The resultant correlation statistic y' is supplied to a maximum value detector 84.

In accordance with the determination criterion given by equation (30), the maximum value detector 84 determines the maximum value $y'_{n'}{}^{(k',m(max))}$ of the correlation statistics $y'_{n'}{}^{(k',1)}, y'_{n'}{}^{(k',2)}, \ldots, y'_{n'}{}^{(k',M)}$ associated with the user #k in the correlation statistic y' supplied from the inverse correlation calculator 83. The maximum value detector 84 then determines m(max) at which the maximum value $y'_{n'}{}^{(k',m(max))}$ is obtained. Furthermore, on the basis of the determined m(max), the maximum value detector 84 estimates a suboptimum symbol sequence $b'_{n'}{}^{(k')}$ for the user #k and outputs it as demodulated data. The maximum value detector 84 also determines and outputs demodulated data for other users in a similar manner.

In FIG. 11, the correlation matrix calculator 81, the inverse matrix calculator 82, and the inverse correlation calculator 83 form the decorrelator.

Figure 12:
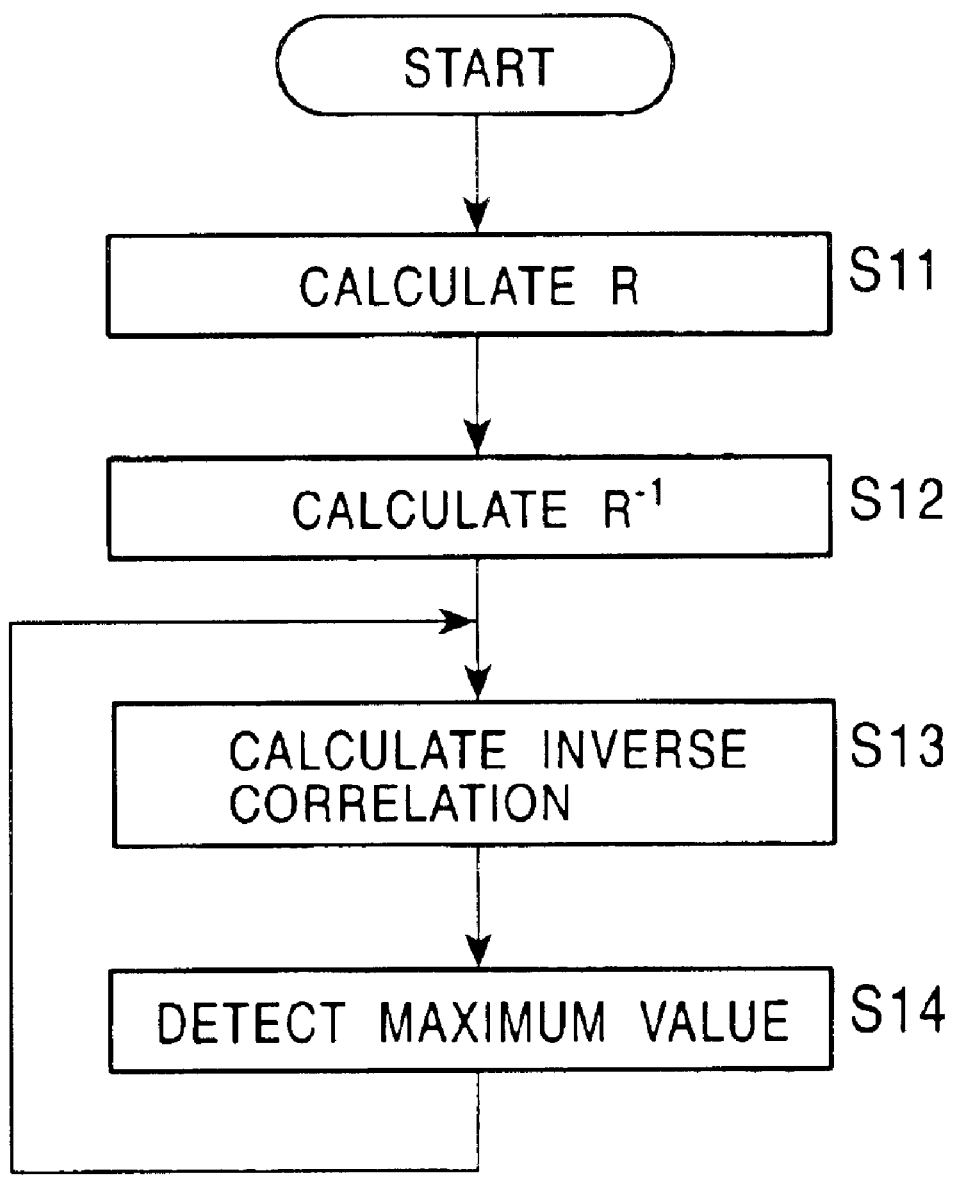
FIG. 12 is a flow chart showing the process performed by the UWB demodulator functioning as the suboptimum demodulator shown in FIG. 11.

FIG. 12 is a flow chart showing the process performed by the UWB demodulator 13 constructed in the form of the suboptimum multi-user demodulator using the decorrelator such as that shown in FIG. 11.

In the first step S11, the correlation matrix calculator 81 determines the correlation matrix R and outputs the result to the inverse matrix calculator 82. Thereafter, the process proceeds to step S12. In step S12, the inverse matrix calculator 82 determines the inverse matrix $R^{-1}$ of the correlation matrix R and supplies the resultant inverse matrix $R^{-1}$ to the inverse correlation calculator 83.

Thereafter, the correlator 21 determines the correlation between the received signal r(t) and the local pulses and supplies the correlation statistic y obtained as a result to the inverse correlation calculator 83. In step S13, in accordance with equation (32), the inverse correlation calculator 83 determines the correlation statistic y' by mapping the correlation statistic y into a signal space including no multiple-access interference. The result is outputted to the maximum value detector 84.

In step S14, the maximum value detector 84 determines the maximum value of the correlation statistic y' supplied from the inverse correlation calculator 83 for each user in accordance with the determination criterion given by equation (30). Furthermore, on the basis of the maximum value, the maximum value detector 84 estimates a suboptimum symbol sequence b' for each user and outputs it as demodulated data.

Thereafter, the process returns to step S13, and the above-described operation is performed again when the correlation statistic y associated with the next received signal r(t) is supplied from the correlator 21.

In the case where the UWB demodulator 13 is constructed in the form of an optimum demodulator, as described above with reference to FIGS. 9 and 10, correlation matrix information is required when the correlation matrix R is calculated, and estimated energy of a signal transmitted from each user is required when the energy matrix A is calculated. In the case where the UWB demodulator 13 is constructed in the form of a suboptimum demodulator using a decorrelator as shown in FIG. 11, calculation of the energy matrix A is not needed although calculation of the correlation matrix R is required. That is, in this case, it is not needed to estimate the energy of the transmitted signal from each user.

When the WUB demodulator 13 is constructed using the decorrelator, although the correlation statistic y is mapped by the decorrelator into the signal space including no multiple-access interference and thus interference components are removed, a slight increase in noise occurs.

Although, in the above example, a decorrelator is used to construct the UWB demodulator 13 into the form of a suboptimum multi-user demodulator (suboptimum detector), an MMSE (Minimum Mean Square Error) detector may also be employed.

The MMSE detector converts the correlation statistic y such that the mean square error thereof becomes minimum. This allows well-balanced reductions in intersymbol interference by means of zero-forcing method and white Gaussian noise. For example, the MMSE detector for this purpose may be constructed in a similar manner to a single-user linear MMSE detector.

After conversion of the correlation statistic y using the linear MMSE detector, a suboptimum symbol sequence $b'_{n'(1,m)}, b'_{n'(2,m)}, \ldots b'_{n'}{}^{(k,m)}$ for the users #k to #K can be estimated in accordance with the determination criterion given by equation (30).

Figure 13:
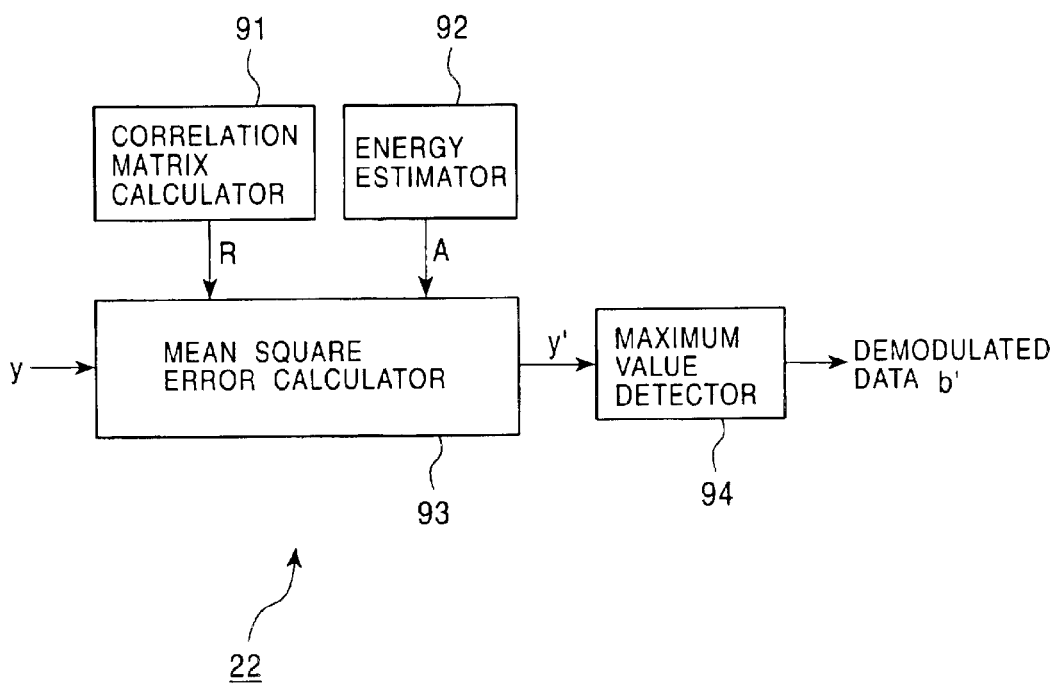
FIG. 13 is a block diagram illustrating a second example of a construction of a symbol detector functioning as a suboptimum demodulator.

FIG. 13 shows an example of a construction of the symbol detector 22 in the UWB demodulator 13 constructed as a suboptimum multi-user demodulator using a linear MMSE detector.

As with the correlation matrix calculator 71 shown in FIG. 9, a correlation matrix calculator 91 calculates the correlation matrix and supplies the result to a mean square error calculator 93. An energy estimator 92 determines the energy matrix A, as with the energy estimator 72 shown in FIG. 9, and supplies it to the mean square error calculator 93.

In addition to the correlation matrix R outputted from the correlation matrix calculator 91, the energy matrix A outputted from the energy estimator 92 and the correlation statistic y outputted from the correlator 21 are also supplied to the mean square error calculator 93. The mean square error calculator 93 converts the correlation statistic y outputted from the correlator 21 into y' with a minimized mean square error using a conversion matrix expressed using the correlation matrix R and the energy matrix A as shown in equation (33) and supplies the result y' to the maximum value detector 94.

$$y' = \left[R + \frac{N_0}{2}(AA)^{-1}\right]^{-1} y \tag{33}$$

In accordance with the determination criterion given by equation (30), the maximum value detector 94 determines, as with the maximum value detector 84 shown in FIG. 11, the maximum value $y'_{n'}{}^{(k',m(max))}$ of the correlation statistics $y'_{n'}{}^{(k',1)}, y'_{n'}{}^{(k',2)}, \ldots, y'_{n'}{}^{(k',M)}$ associated with the user #k in the correlation statistic y' supplied from the mean square error calculator 93. Furthermore, on the basis of a m(max) at which the maximum value $y'_{n'}{}^{(k',m(max))}$ is obtained, the maximum value detector 94 estimates a suboptimum symbol sequence $b'_{n'}{}^{(k')}$ for the user #k' and outputs it as demodulated data. The maximum value detector 94 also determines and outputs demodulated data for the other users in a similar manner.

In FIG. 13, the correlation matrix calculator 91, the energy estimator 92, and the mean square error calculator 93 form the linear MMSE detector.

Figure 14:
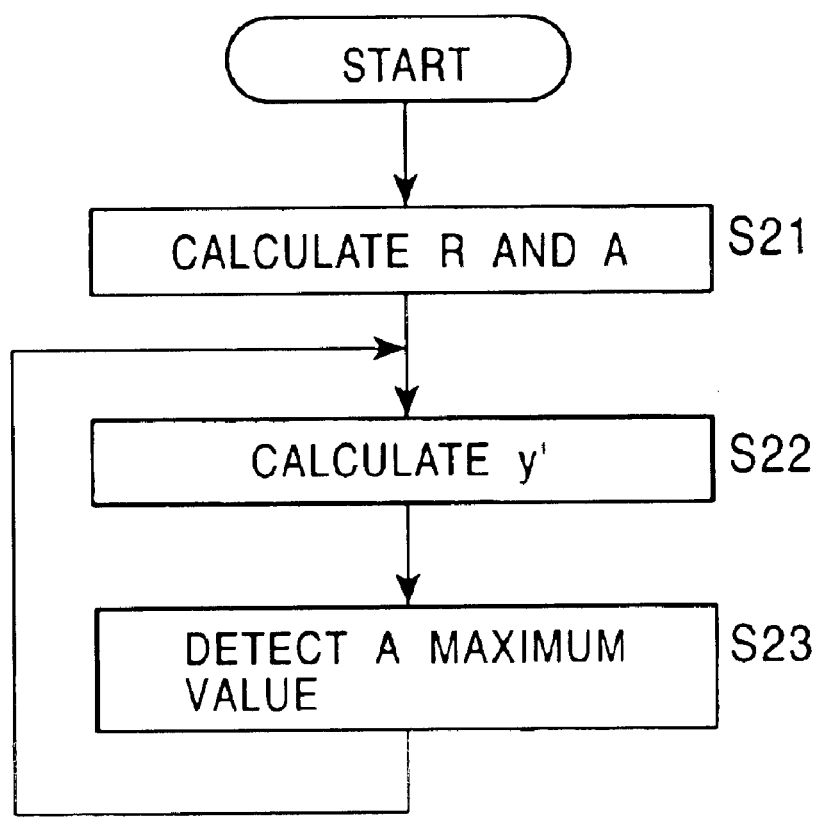
FIG. 14 is a flow chart showing the process performed by the UWB demodulator functioning as the suboptimum demodulator shown in FIG. 14.

FIG. 14 is a flow chart showing the process performed by the UWB demodulator 13 constructed in the form of the suboptimum multi-user demodulator using the linear MMSE detector such as that shown in FIG. 13.

First, in step S21, the correlation matrix calculator 91 determines the correlation matrix R, and the energy estimator 92 determines the energy matrix A. The resultant correlation matrix R and the energy matrix A are supplied to the mean square error calculator 93.

The correlator 21 determines the correlation between the received signal r(t) and the local pulses, and the correlation statistic y obtained as a result is supplied to the mean square error calculator 93. In step S22, the mean square calculator 93 converts the correlation statistic y into a correlation statistic y, in accordance with equation (33) and supplies it to the maximum value detector 94.

In step S23, the maximum value detector 94 determines the maximum value of the correlation statistic y' supplied from the mean square error calculator 93 for each user in accordance with the determination criterion given by equation (30). Furthermore, on the basis of the maximum value, the maximum value detector 94 estimates a suboptimum symbol sequence b' for each user and outputs it as demodulated data.

Thereafter, the process returns to step S22, and the above-described operation is performed again when the correlation statistic y associated with the next received signal r(t) is supplied from the correlator 21.

Various types of cancellers for canceling interference, such as parallel interference cancellers, successive interference cancellers, and decision feedback cancellers, are described, for example, in the literatures Refs. 10 to 12 or in "Analysis of a simple successive interference cancellation scheme in a DS/CDMA system", by P. Patel and J. M. Holtzman (IEEE J. Select Areas Communications, Vol. 12, pp. 796–807, June 1994 (hereinafter, denoted as Ref. 16). The principle behind their design is the construction of MAI and its subtraction from the received signal to generate improved symbol decisions on the basis of the correlation matrix. In the case where the UWB demodulator 13 is constructed in the form of a suboptimum multi-user demodulator (suboptimum detector), one of such interference cancellers cited above or any combination of such interference cancellers may be employed.

That is, in the case were the UWB demodulator 13 is constructed in the form of a suboptimum multi-user demodulator using an interference canceller, the interference canceller 23 may be disposed between the correlator 21 and the symbol detector 22 as represented by a broken line in FIG. 3.

In this case, using all correlation statistics $y_{n'}^{(1)}, y_{n'}^{(2)}, \ldots, y_{n'}^{(k)}$ outputted from the correlator 21, the interference canceller removes interference components among users (multiple-access interference) from the correlation statistics $y_{n'}^{(1)}, y_{n'}^{(2)}, \ldots, y_{n'}^{(k)}$ associated with the respective users, and outputs the result to the symbol detector 22. The symbol detector 22 estimates a suboptimum symbol (sequence) for each user, in accordance with the determination criterion given by equation (30).

As described above, in the present embodiment, the UWB demodulator 13 calculates the correlation between the received signal r(t) corresponding to the signals transmitted from a plurality of users by means of the UWB communication scheme and pulses (local pulses) at possible positions of the transmitted signals from the plurality of users. On the basis of the obtained correlation statistic y, and taking into account interference among the signals transmitted from the plurality of users, the received signal r(t) is demodulated into original data issued by the plurality of users. Thus, a high-performance UWB communication demodulator is achieved according to the present embodiment of the invention.

For example, in the DS-CDMA (Direct Sequence CDMA) communication, the processing gain determined by the ratio of the chip rate to the data rate is limited so that the correlation among signals transmitted from users does not become equal to 0. That is, in the CDMA communication, at a transmitting device, data is multiplied by a spread code in one period thereby spreading the spectrum of the data over a wide band. At a receiving device, a received signal is multiplied by the same spread code as that employed at the transmitting device and the resultant product is integrated over one period of the spread code thereby determining the correlation with the received signal. Thus, in the CDMA communication, the correlation between spread codes assigned to different users remains for a long time.

In contrast, in the UWB communication, the processing gain is determined by the bandwidth-to-PRF ratio. Because the bandwidth is very wide as described above, the processing gain becomes large. Thus, there is a high probability that the correlation among signals transmitted from different users becomes 0. That is, in the UWB communication, no spread code is used, but data is transmitted using very short pulses which cause the frequency spectrum to be distributed over an ultra wide band. Therefore, in the UWB communication, the correlation in the time domain is localized. Thus, in the UWB communication, the correlation matrix R becomes a sparse matrix (most elements of which are 0). In the correlation matrix R, non-zero elements representing correlations indicate that a collision occurs between pulses, that is, multiple-access interference occurs. The non-zero correlation increases with increasing M indicating the number of chip intervals in a unit symbol period. A reduction in the processing gain and an increase in the number of multiple-access users K (user capacity) also result in an increase in the non-zero correlation.

The dimension of the correlation matrix R increases in proportion to the number of users K and the number of symbols N of a symbol sequence to be estimated. The increase in the dimension of the correlation matrix R results in a great increase in the complexity of the calculation performed by the UWB demodulator 13.

However, if the correlation matrix R is sparse, the correlation matrix R can be divided into lower-dimensional matrices in the calculation. This allows a reduction in the complexity of the calculation performed by the UWB demodulator 13. For example, in the case where the UWB demodulator 13 includes the interference canceller 23 as shown in FIG. 3, the interference canceller 23 is needed to perform a canceling process only for users among which multiple-access interference can occur on the basis of the TH time $T_n^{(k)}$. This allows a reduction in the complexity of the process.

When the condition $KMT_p<T_S$ is satisfied, symbols #1, #2, ..., #N in a symbol sequence do not have an overlap, at rising-up/falling-down edges, between pulses corresponding to symbols. This makes it unnecessary to deal with a problem caused by overlapping between pulses, and thus, the UWB demodulator 13 is needed to detect not a sequence of symbols but a symbol. That is, when the symbol period satisfies the condition $MT_p<T_S$, any symbol (pulse) of any user is not interfered with by nearby symbols, and thus the correlation statistics associated with the respective users, outputted from the correlator 21, become independent of each other.

In the UWB communication, as described above, unlike the CDMA communication in which the correlation among signals transmitted from different users does not generally become 0, the correlation matrix R becomes sparse, and thus a drastic reduction in the complexity of the process can be achieved.

It will be described in more detail below how the sparse form of the correlation matrix R allows a reduction in the complexity of the process performed by the UWB demodulator 13 in UWB multiple-access communication.

The correlation matrix R is given in the form of a symmetric matrix. Therefore, its elements $\rho_{n,k,m}^{n',k',m'}$ given by equation (13) representing the correlations satisfy the condition $\rho_{n,k,m}^{n',k',m'} = \rho_{n',k',m'}^{n,k,m}$.

Herein, we assume that the correlation matrix R consists of N×N matrices $r_n^{n'}$ as shown in equation (34).

$$R = \begin{bmatrix} r_1^1 & \cdots & r_N^1 \\ \vdots & \ddots & \vdots \\ r_1^N & \cdots & r_N^N \end{bmatrix} \quad (34)$$

In equation (34), each matrix $r_n^{n'}$ is a KM×KM matrix consisting of elements each representing the correlation between a pulse $a^{(m)}(t-nT_S-T_n^{(k)})$ located in an nth symbol of the received signal r(t) and an n'th local pulse $a^{(m')}(t-n'T_S-T_{n'}^{(k')})$ and the matrix $r_n^{n'}$ can be represented by K×K matrices $r_{n,k}^{n',k'}$ as shown below.

$$r_n^{n'} = \begin{bmatrix} r_{n,1}^{n',1} & \cdots & r_{n,K}^{n',1} \\ \vdots & \ddots & \vdots \\ r_{n,1}^{n',K} & \cdots & r_{n,K}^{n',K} \end{bmatrix} \quad (35)$$

In equation (35), each matrix $r_{n,k}^{n',k'}$ is an M×M matrix $r_{n,k,m}^{n',k',m'}$ consisting of elements each representing the correlation between a pulse $a^{(m)}(t-nT_S-T_n^{(k)})$ located in an nth symbol of a user #k in the received signal r(t) and an n'th local pulse $a^{(m')}(t-n'T_S-T_{n'}^{(k')})$ of a user #k', and the matrix $r_{n,k}^{n',k'}$ can be represented by M×M matrices $r_{n,k,m}^{n',k',m'}$ as shown below.

$$r_{n,k}^{n',k'} = \begin{bmatrix} r_{n,k,1}^{n',k',1} & \cdots & r_{n,k,M}^{n',k',1} \\ \vdots & \ddots & \vdots \\ r_{n,k,1}^{n',k',M} & \cdots & r_{n,k,M}^{n',k',M} \end{bmatrix} \quad (36)$$

Of the matrices $r_n^{n'}$ given by equation (35), those matrices whose n and n' satisfy the condition |n'-n|>1 are zero matrices. Therefore, the correlation matrix R given by equation (34) can be represented into the form of a matrix including N×N matrices as elements, as shown below:

$$R = \begin{bmatrix} r_1^1 & r_2^1 & O_{KM} & O_{KM} & O_{KM} & \cdots & O_{KM} \\ r_1^2 & r_2^2 & r_3^2 & O_{KM} & O_{KM} & \cdots & O_{KM} \\ O_{KM} & r_2^3 & r_3^3 & r_4^3 & O_{KM} & \cdots & O_{KM} \\ \vdots & \ddots & & \ddots & & \ddots & \vdots \\ O_{KM} & \cdots & \cdots & \cdots & O_{KM} & r_{N-1}^N & r_N^N \end{bmatrix} \quad (37)$$

In equation (37), matrix $O_x$ denotes an x×x zero matrix.

From equation (37), the correlation matrix R becomes a triangular symmetric matrix similar to that described, for example, in "Matrix Computations" 3rd ed., by G. H. Golub and C. F. Van Loan (The Johns Hopkins University Press, 1996, pp. 16–17, (hereafter, denoted as "Ref. 17")).

Herein, the "triangular symmetric matrix" refers to a matrix whose elements are 0 except for diagonal elements and adjacent elements on both sides of diagonal elements. When the correlation matrix R is expressed using matrices $r_n^{n'}$ given by equation (35) as elements, the correlation matrix R becomes a triangular symmetric matrix. In other words, if the correlation matrix R is represented using elements which are all scalar, it does not become a triangular symmetric matrix. In this regard, the correlation matrix R is not a triangular symmetric matrix in the strict sense.

When k=k', elements correspond to symbols from the same user. Because there is no correlation among nearby symbols from the same user, the matrix $r_{n,k}^{n',k'}$ $(=r_{n,k}^{n',k})$ given by equation (36) becomes a zero matrix $O_m$. In the case where k=k' and n=n', elements correspond to the symbol from the same user. In this case, because pulses at different possible positions for the same symbol are orthogonal to each other, the correlation $\rho_{n,k,m}^{n',k',m'}$ $(=\rho_{n,k,m}^{n,k,m'})$ in equation (14) can be calculated as follows:

$$\rho_{n,k,m}^{n,k,m'} = \begin{cases} 1, & \text{if } m' = m, \\ 0, & \text{otherwise.} \end{cases} \quad (38)$$

Therefore, when k=k' and n=n', the matrix $r_{n,k}^{n',k'}$ given by equation (36) becomes an M×M unit matrix $I_m$. Herein $I_x$ denotes an x×x unit matrix.

Herein, let us assume that the number of users, K, is equal to 3, and symbol detection (N=1) is performed for a received signal modulated by means of binary pulse position modulation (that is, M=2).

Let us further assume that the chip interval $T_p$ in equation (4) is equal to 1.5 ns, the parameter $\tau_{uwb}$ in equation (5) is equal to 0.7531, and the symbol transmission interval $T_S$ in equation (2) is greater than $10T_p$. Furthermore, as for the TH time $T_n^k$ in equation (2), it is assumed that $T_1^{(1)}=0$, $T_1^{(2)}=T_p$, and $T_1^{(3)}32\ 5T_p$. Still furthermore, the energy of the transmitted signal is identical for all three users #1 to #3.

Under the above conditions, the correlation matrix R can be determined as a 6 (=1×3×2)×6 matrix as follows:

$$R = \begin{bmatrix} 1 & 0 & 0 & 0 & 0 & 0 \\ 0 & 1 & 1 & 0 & 0 & 0 \\ 0 & 1 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \quad (39)$$

Herein symbols transmitted from the users #1 to #3 can be determined by means of the maximum-likelihood estimation in accordance with equation (31). That is, in accordance with equation (31), the estimated symbols (vector) b' is given by a 6×1 vector as shown below.

$$b' = \left[ b_1'^{(1)T}, b_1'^{(2)T}, b_1'^{(3)T} \right]^T \quad (40)$$

In equation (40), each element $b'_n{}^k$ of the vector b' is a 2 (=M)×1 vector.

In the case where the correlation matrix R is given by equation (39), the problem of detecting symbols from the three users #1 to #3 reduces to detecting two symbols as described below.

That is, the correlation matrix R in equation (39) can be divided into four matrices: a 4×4 matrix on the upper left side; a 2×4 matrix on the lower left side; a 4×2 matrix on the upper right side; and a 2×2 matrix on the lower right side, as shown in equation (41). This means that although multiple-access interference occurs between the user #1 and the user #2, the user #3 has no multiple-access interference with the other users.

$$R = \begin{bmatrix} \begin{pmatrix} 1 & 0 & 0 & 0 \\ 0 & 1 & 1 & 0 \\ 0 & 1 & 1 & 0 \\ 0 & 0 & 0 & 1 \end{pmatrix} & \begin{pmatrix} 0 & 0 \\ 0 & 0 \\ 0 & 0 \\ 0 & 0 \end{pmatrix} \\ \begin{pmatrix} 0 & 0 & 0 & 0 \\ 0 & 0 & 0 & 0 \end{pmatrix} & \begin{pmatrix} 1 & 0 \\ 0 & 1 \end{pmatrix} \end{bmatrix} \quad (41)$$

Herein, if the 4×4 matrix on the upper right side in equation (41) is denoted by R' and the x×y zero matrix is denoted by $O_{x,y}$, then the correlation matrix R in equation (41) can be expressed as follows:

$$R = \begin{bmatrix} R' & O_{4,2} \\ O_{2,4} & I_2 \end{bmatrix} \quad (42)$$

From equation (42), the detection of symbols according to equation (31) reduces to detecting symbols from the user #1 and the user #2 between which multiple-access interference occurs and detecting the symbol from the user #3 having no interference with the other users.

Thus, the estimated symbols [$b'_1{}^{(1)}$, $b'_1{}^{(2)}$] from the user #1 and the user #2 can be determined on the basis of equation (43) corresponding to equation (31), and the estimated symbol $b'_1{}^{(3)}$ from the user #3 can be determined on the basis of equation (44) corresponding to equation (31).

$$\left[ b_1'^{(1)T}, b_1'^{(2)T} \right]^T = \arg\min_{\left[ b_1^{(1)T}, b_1^{(2)T} \right]^T} \left\| \left[ y_1^{(1)T}, y_1^{(2)T} \right]^T - R'\left[ b_1^{(1)T}, b_1^{(2)T} \right]^T \right\|^2 \quad (43)$$

$$b_1'^{(3)} = \operatorname*{argmin}_{b_1^{(3)}} \| y_1^{(3)} - I_2 b_1^{(3)} \|^2 \quad (44)$$

In the UWB communication, because the correlation matrix R has a sparse form as described above with reference to, for example, equation (39), the correlation matrix R can be divided (reduced) as shown in equation (42), and thus the calculation cost can be drastically reduced compared with the cost needed when the correlation matrix R is not (cannot be) divided.

In the case where in all N symbols from all users #1 to #K, pulses at M possible positions are orthogonal to each other, that is, in the case where there is no overlap among pulses, the correlation matrix R becomes an NKM×NKM unit matrix $I_{n,k,m}$. When the correlation matrix R becomes a unit matrix as in the above-described case, the process performed by the multi-user UWB demodulator 13 becomes equivalent to the process performed by K single-user demodulators.

Figure 15:
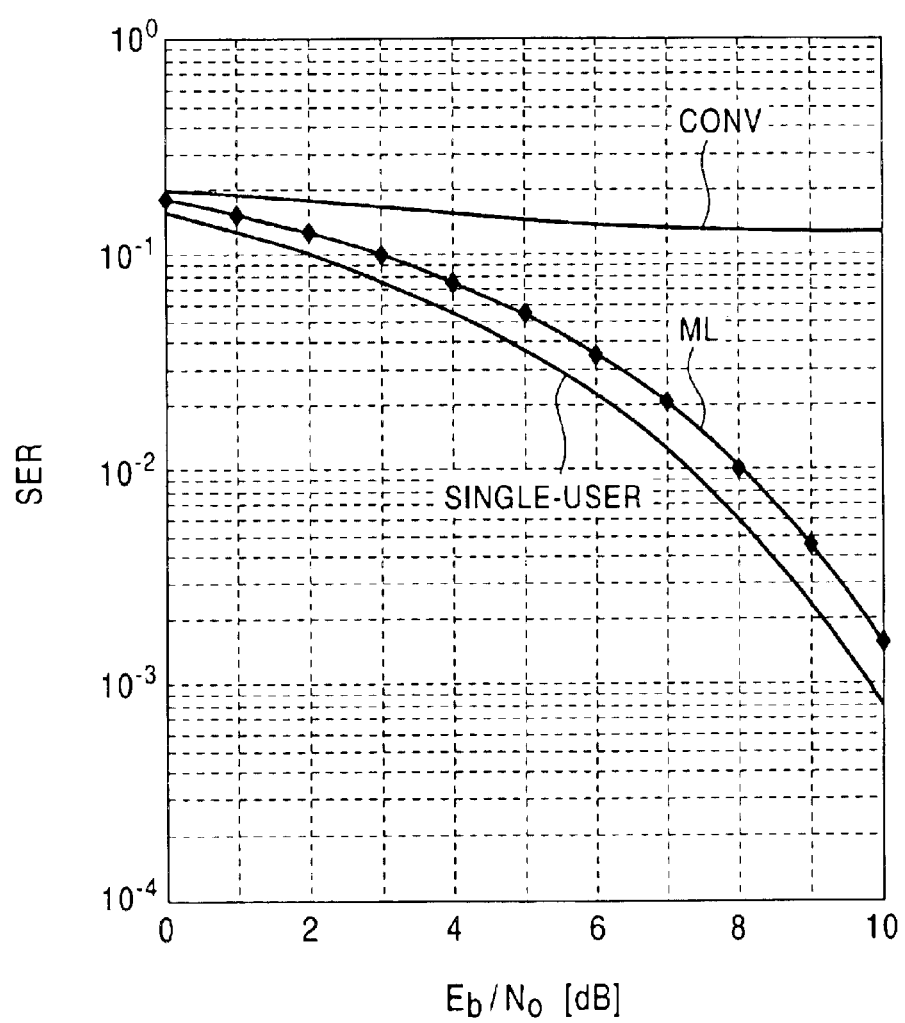
FIG. 15 is a graph illustrating a simulation result.
Figure 16:
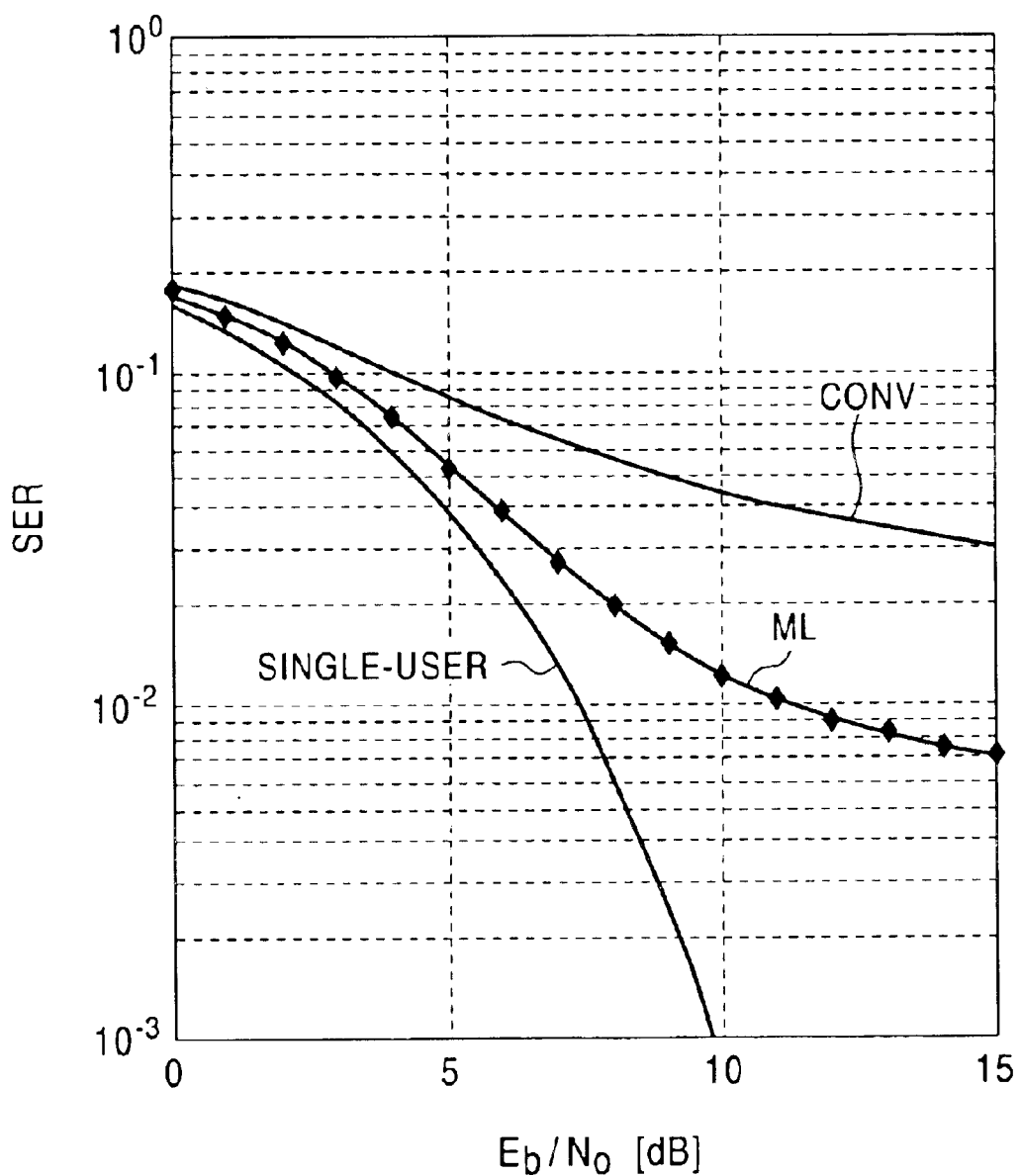
FIG. 16 is a graph illustrating a simulation result.

FIGS. 15 and 16 shows the simulated value of the SER (Symbol Error Rate) as a function of $E_b/N_O$ for the UWB demodulator 13 constructed in the form of an optimum multi-user demodulator (optimum detector).

The simulation shown in FIGS. 15 and 16 was performed by means of Monte-Carlo method on the assumption that M=2, $T_p$=1.5 ns, $\tau_{uwb}$=0.7531, and the signal energy from any user has an identical value $E_S$.

In FIG. 15, the number of users, K, is assumed to be 2, and the TH times $T_1^{(1)}$ and $T_1^{(2)}$ are assumed to be 0 and $T_p$, respectively. Furthermore, in FIG. 15, the symbol transmission period $T_S$ is set so as to satisfy the condition $T_S$>$KMT_p$ (=4$T_p$) and thus so that N=1, that is, a symbol is detected. The bit energy $E_b$ is calculated according to $E_b$=$E_S$/log$_2$M.

In FIG. 15 (and also in FIG. 16), a curve labeled "ML" indicates the SER for the optimum multi-user demodulator, and a curve labeled "CONV" indicates the SER for the single-user demodulator. In the single-user demodulator, as can be seen from FIG. 15, no significant improvement in the SER is obtained if the $E_b/N_O$ is increased, and an error floor due to multiple-access interference occurs. That is, in the single-user demodulator, because multiple-access interference is not taken into account, a pulse placed in the first symbol to transmit data #d from a user #1 and a pulse placed in the first symbol to transmit the same data #d from a user #2 are both detected by the demodulator of the user #1 as a pulse placed in the first symbol from the user #1, even in an ideal environment including no noise. That is, because M=2 in this example, the unit symbol interval is divided into two chip intervals, and a pulse is placed only in one of the two chip intervals. Herein, the TH times for the user #1 and user #2 are respectively 0 and $T_p$, and thus the difference between them is equal to the chip interval $T_p$. As a result, the demodulator of the user #1 detects pulses at both positions in the first symbol. In fact, the simulation indicates that the correlation statistic has the same value for both positions. The detection by the demodulator of the user #2 becomes similar for the second symbol transmitted from the users #1 and #2.

In contrast, in the optimum multi-user demodulator, because the multiple-access interference is taken into account, the SER is improved as the $E_b/N_O$ increases.

In FIG. 15, a curve labeled "SINGLE-USER" indicates the lower limit of the SER of the single-user demodulator when there is no multiple-access interference. As can be seen from FIG. 15, the SER of the optimum multi-user demodulator is similar to the ideal value, that is, the lower limit of the SER of the single-user demodulator when there is no multiple-access interference.

In FIG. 15 (and also in FIG. 16), the curve labeled "SINGLE-USER" was calculated in accordance with a theoretical expression descried in "Digital Communication" by J. G. Proakis (McGraw-Hill, 4th. ed., 2001, p.261 (hereafter, denoted as Ref. 18)). This value is similar to the practical lower limit in the range of $E_b/N_O$>4 log 2≈4.4 dB.

The performance of the multi-user demodulator varies depending on the relative value of the TH time $t_n{}^k$ for respective users. As described above, the time hopping is performed to avoid collisions among users. If there is no pulse collision among users, the performance of the multi-user demodulator becomes similar to the ideal performance obtained by the single-user demodulator when there is no multiple-access interference. That is, in FIG. 15, the SER of the optimum multi-user demodulator indicated by the curve "ML" is similar to the lower limit of the SER of the single-user demodulator indicated by the curve "SINGLE-USER".

On the other hand, when there is perfect collide between pulses from different users, such as can occur when the TH times $T_1^{(1)}$ and $T_1^{(2)}$ are both 0 and the pulse position of the user #1 and the pulse position of the user #2 become coincident with each other, the SER of the optimum multi-user demodulator represented by the curve "ML" in FIG. 15 becomes identical to the SER of the single-user demodulator represented by the curve "CONV".

In the simulation shown in FIG. 16, it is assumed that the number of users, K, is equal to 4, and the symbol transmission interval $T_S$ is equal to 10 ns (and thus, the PRF becomes 100 MHz (=$\frac{1}{10}$ (ns)). In the simulation shown in FIG. 16, the TH time $t_n^k$ is given by a random number.

In FIG. 16, an error floor occurs in the SER for both the optimum multi-user demodulator (indicated by a curve "ML") and the single-user demodulator (indicated by a curve "SINGLE-USER").

However, at $E_{b/NO}$=15 dB, the SER of the optimum multi-user demodulator (indicated by the curve "ML") is lower than that of the single-user demodulator (indicated by the curve "CONV") by a factor greater than 4.

The above improvement in the SER by a factor greater than 4 is achieved because, in the multi-user demodulator, unlike the single-user demodulator in which demodulation is performed for each user, demodulation is performed jointly for all four users. The improvement in the SER achieved by the multi-user demodulator, indicated in FIG. 16, is very great.

The processing sequence described above may be executed by hardware or software. When the processes are performed by software, a software program is installed on a general-purpose computer or the like.

Figure 17:
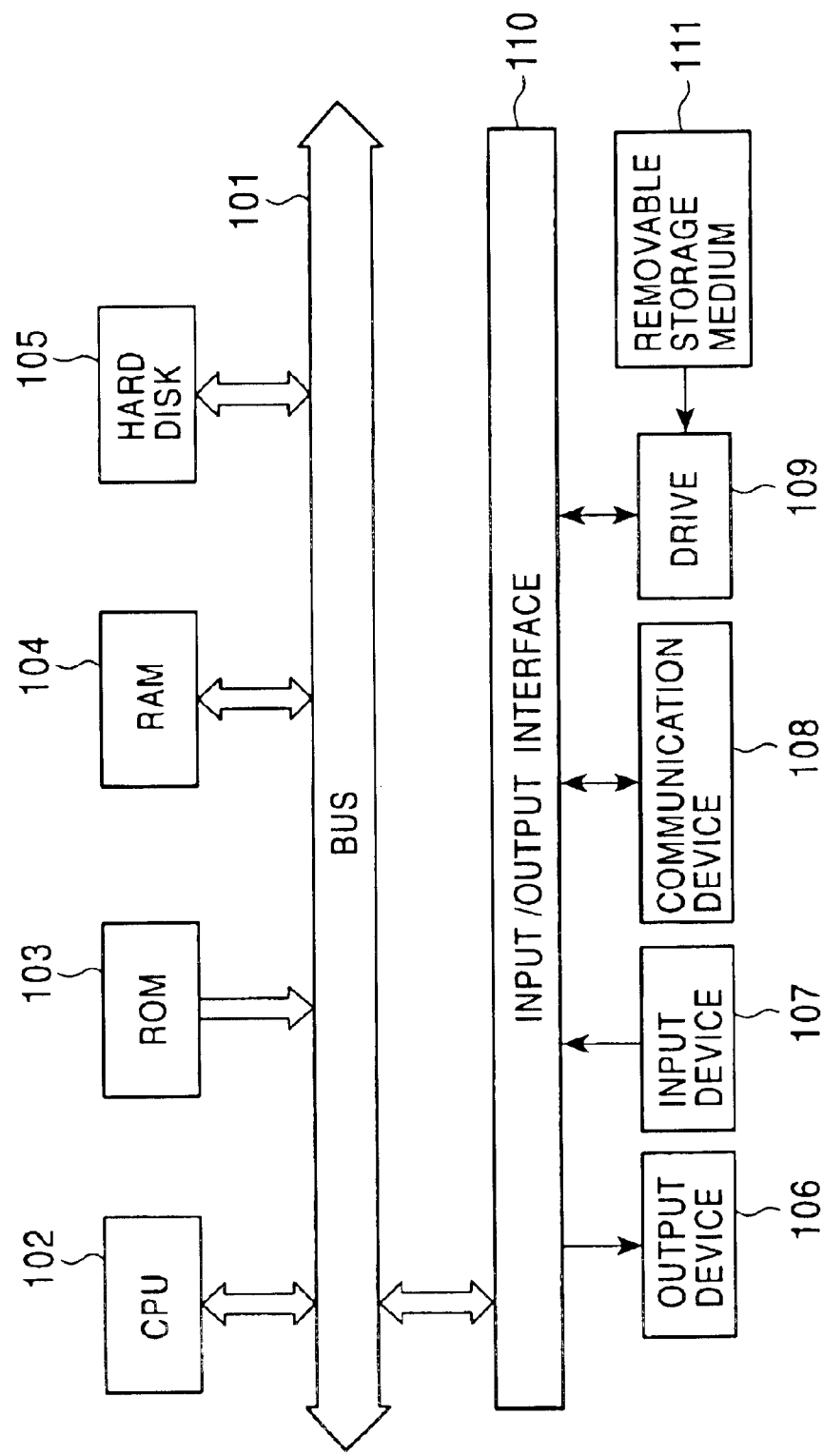
FIG. 17 is a block diagram illustrating an example of a construction of a computer according to an embodiment of the present invention.

FIG. 17 illustrates an embodiment of the invention in which a program used to execute the processes described above is installed on a computer.

The program may be stored, in advance, on a hard disk 105 serving as a storage medium or in a ROM 103 which are disposed inside the computer.

Alternatively, the program may be stored (recorded) temporarily or permanently on a removable storage medium 111 such as a floppy disk, a CD-ROM (Compact Disc Read Only Memory), an MO (Magnetooptical) disk, a DVD (Digital Versatile Disc), a magnetic disk, or a semiconductor memory. Such a removable recording medium 111 may be provided in the form of so-called package software.

Instead of installing the program from the removable recording medium 111 onto the computer, the program may also be transferred to the computer from a download site via a digital broadcasting satellite by means of radio transmission or via a network such as an LAN (Local Area Network) or the Internet by means of wire communication. In this case, the computer receives, using a communication unit 108, the program transmitted in such a manner and installs the program on the hard disk 105 disposed in the computer.

The computer includes a CPU (Central Processing Unit) 102. When a user inputs a command by operating an input device 107 such as a keyboard or a mouse connected to the CPU 101 via a bus 101, the command is transferred to the CPU 102 via the input/output interface 110. In accordance with the command, the CPU 102 executes a program stored in the ROM (Read Only Memory) 103. Alternatively, the CPU 102 may execute a program loaded in a RAM (Random Access Memory) 104 wherein the program may be loaded into the RAM 104 by transferring a program stored on the hard disk 105 into the RAM 104, or transferring a program which has been installed on the hard disk 105 after being received from a satellite or a network via the communication unit 108, or transferring a program which has been installed on the hard disk 105 after being read from a removable recording medium 111 loaded on a drive 109, thereby performing the process described above with reference to the flow charts and the block diagram. The CPU 102 outputs the result of the process, as required, to an output device such as an LCD (Liquid Crystal Display) or a loudspeaker via an input/output interface 110. The result of the process may also be transmitted via the communication unit 108 or may be stored on the hard disk 105.

In the present invention, the processing steps described in the program to be executed by a computer to perform various kinds of processing are not necessarily required to be executed in time sequence according to the order described in the flow chart. Instead, the processing steps may be performed in parallel or separately (by means of parallel processing or object processing).

The program may be executed either by a single computer or by a plurality of computers in a distributed fashion. The program may be transferred to a computer at a remote location and may be executed thereby.

Note that the UWB demodulator 13 can deal with the received signal r(t) regardless of whether there is multiple-access interference.

As described above, the communication device, the communication method, and the program according to the present invention have great advantages. That is, the correlation is calculated between the received signal corresponding to the signals transmitted from a plurality of communication terminals by means of UWB (Ultra WideBand) communication technology and pulses at possible positions in the transmitted signals from the respective communication terminals, and the received signal is demodulated into original data issued by the communication terminals on the basis of the calculated correlation taking into account interference among the transmitted signals from the respective communication terminals. Thus, a high-performance UWB communication demodulator is achieved.

What is claimed is:

1. A communication device for communicating with a plurality of communication terminals in a multiple-access communication system, comprising:

correlation calculation means for calculating a correlation between a received signal including a plurality of signals respectively transmitted from the plurality of communication terminals using ultra-wideband (UWB) communication waveforms and local pulses at possible positions in the respective signals transmitted from each of the plurality of communication terminals;

interference canceling means for removing a multiple-access interference among the plurality of signals transmitted from the plurality of communication terminals from the calculated correlation; and demodulation means for demodulating data transmitted from each of the plurality of communication terminals based on an output from the interference canceling means, wherein the demodulation means demodulates data by detecting one of a suboptimum symbol and a suboptimum symbol sequence based on the calculated correlation and the multiple-access interference among the plurality of signals transmitted from the plurality of communication terminals, and the demodulation means includes inverse correlation calculator means for making a conversion of the calculated correlation using an inverse matrix of a correlation matrix indicating the correlation among the pulses at possible positions in the respective transmitted signals; and detection means for detecting one of the suboptimum symbol and the suboptimum symbol seguence based on the output of the inverse correlation calculator means.

2. The communication device according to claim 1, wherein the plurality of signals transmitted from the plurality of communication terminals are generated by modulating data by means of M-ary pulse position modulation.

3. The communication device according to claim 1, wherein the plurality of signals transmitted from the plurality of communication terminals are generated by modulating data by means of M-ary orthogonal modulation.

4. The communication device according to claim 1, wherein the demodulation means demodulates data by detecting one of an optimum symbol and an optimum symbol sequence based on the calculated correlation and the multiple-access interference among the plurality of signals transmitted from the plurality of communication terminals.

5. The communication device according to claim 4, wherein the demodulation means detects one of the optimum symbol and the optimum symbol sequence by means of maximum-likelihood estimation based on the correlation, a correlation matrix indicating the correlation among the pulses at possible positions in the respective transmitted signals, the energy of the respective transmitted signals, and the possible pulse positions.

* * * * *